(12) United States Patent
Beard et al.

(10) Patent No.: US 10,803,106 B1
(45) Date of Patent: *Oct. 13, 2020

(54) SYSTEM WITH METHODOLOGY FOR DYNAMIC MODULAR ONTOLOGY

(71) Applicant: Palantir Technologies Inc., Palo Alto, CA (US)

(72) Inventors: Mitch Beard, Jersey City, NJ (US); Mike Glazer, San Francisco, CA (US); Robin Lim, Mountain View, CA (US); Joel Ossher, Vienna, VA (US); Youssef Moussaoui, Palo Alto, CA (US); Dathan Bennett, Palo Alto, CA (US); Javier Campanini, Mountain View, CA (US); Agatha Yu, San Francisco, CA (US); Mark Elliot, Arlington, VA (US); Steve Matuszek, McLean, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 14/630,472

(22) Filed: Feb. 24, 2015

(51) Int. Cl.
   *G06F 16/35* (2019.01)
(52) U.S. Cl.
   CPC .................. *G06F 16/355* (2019.01)
(58) Field of Classification Search
   CPC ....................... G06F 17/3071; G06F 16/355
   See application file for complete search history.

(56) References Cited

U.S. PATENT DOCUMENTS

| | | |
|---|---|---|
| 5,241,625 A | 8/1993 | Epard et al. |
| 5,845,300 A | 12/1998 | Comer |
| 5,999,911 A | 12/1999 | Berg et al. |
| 6,065,026 A | 5/2000 | Cornelia et al. |

(Continued)

FOREIGN PATENT DOCUMENTS

| | | |
|---|---|---|
| AU | 2007323689 | 11/2007 |
| AU | 2013251186 | 11/2015 |

(Continued)

OTHER PUBLICATIONS

Noy el al., "The PROMPT suite: interactive tools for ontology merging and mapping", 2003.*

(Continued)

*Primary Examiner* — Dawaune A Conyers
(74) *Attorney, Agent, or Firm* — Hickman Palermo Becker Bingham LLP; Adam C. Stone

(57) ABSTRACT

A system with methodology for dynamic modular ontology. In one embodiment, for example, a method comprises: receiving a command from an analyst to create a new ontology module; receiving, from the analyst, a selection of a first ontology module to import into the new ontology module; receiving, from the analyst, a selection of a second ontology module to import into the new ontology module; detecting an ambiguous data type definition conflict between a first definition of a data type in the first ontology module and a second definition of the data type in the second ontology module; generating a third definition of the data type reflecting a resolution of the ambiguous data type (Continued)

definition conflict; and storing, in a data container, the new ontology module comprising the third definition of the data type.

11 Claims, 12 Drawing Sheets

(56) References Cited

U.S. PATENT DOCUMENTS

| | | | |
|---|---|---|---|
| 6,226,561 B1 | 5/2001 | Tamaki et al. | |
| 6,232,971 B1 | 5/2001 | Haynes | |
| 6,237,138 B1 | 5/2001 | Hameluck et al. | |
| 6,243,706 B1 | 6/2001 | Moreau et al. | |
| 6,289,338 B1 | 9/2001 | Stoffel et al. | |
| 6,370,538 B1 | 4/2002 | Lamping et al. | |
| 6,430,305 B1 | 8/2002 | Decker | |
| 6,463,404 B1 | 10/2002 | Appleby | |
| 6,523,019 B1 | 2/2003 | Borthwick | |
| 6,523,172 B1 | 2/2003 | Martinez-Guerra et al. | |
| 6,539,538 B1 | 3/2003 | Brewster et al. | |
| 6,640,231 B1 | 10/2003 | Andersen et al. | |
| 6,665,683 B1 | 12/2003 | Meltzer | |
| 6,748,481 B1 | 6/2004 | Parry et al. | |
| 6,850,317 B2 | 2/2005 | Mullins et al. | |
| 6,877,137 B1 | 4/2005 | Rivette et al. | |
| 6,944,821 B1 | 9/2005 | Bates et al. | |
| 6,967,589 B1 | 11/2005 | Peters | |
| 7,027,974 B1 | 4/2006 | Busch et al. | |
| 7,086,028 B1 | 8/2006 | Davis et al. | |
| 7,089,541 B2 | 8/2006 | Ungar | |
| 7,174,377 B2 | 2/2007 | Bernard et al. | |
| 7,194,680 B1 | 3/2007 | Roy et al. | |
| 7,213,030 B1 | 5/2007 | Jenkins | |
| 7,237,192 B1 | 6/2007 | Fairweather | |
| 7,240,330 B2 | 7/2007 | Fairweather | |
| 7,392,254 B1 | 6/2008 | Jenkins | |
| 7,441,182 B2 | 10/2008 | Beilinson et al. | |
| 7,441,219 B2 | 10/2008 | Perry et al. | |
| 7,533,069 B2 | 5/2009 | Fairweather | |
| 7,685,083 B2 | 3/2010 | Fairweather | |
| 7,765,489 B1 | 7/2010 | Shah | |
| 7,877,421 B2 | 1/2011 | Berger et al. | |
| 7,880,921 B2 | 2/2011 | Dattilo et al. | |
| 7,941,336 B1 | 5/2011 | Robin-Jan | |
| 7,958,147 B1 | 6/2011 | Turner et al. | |
| 7,962,495 B2 | 6/2011 | Jain et al. | |
| 7,966,199 B1 | 6/2011 | Frasher | |
| 8,010,507 B2 | 8/2011 | Poston et al. | |
| 8,073,857 B2 | 12/2011 | Sreekanth | |
| 8,117,022 B2 | 2/2012 | Linker | |
| 8,132,149 B2 | 3/2012 | Shenfield et al. | |
| 8,150,857 B2 * | 4/2012 | Benson | G06F 40/186 707/748 |
| 8,271,948 B2 | 9/2012 | Talozi et al. | |
| 8,290,838 B1 | 10/2012 | Thakur et al. | |
| 8,302,855 B2 | 11/2012 | Ma et al. | |
| 8,489,623 B2 | 7/2013 | Jain et al. | |
| 8,560,494 B1 | 10/2013 | Downing | |
| 8,682,696 B1 | 3/2014 | Shanmugam | |
| 8,688,573 B1 | 4/2014 | Ruknoic et al. | |
| 8,689,182 B2 | 4/2014 | Leithead et al. | |
| 8,732,574 B2 | 5/2014 | Burr et al. | |
| 8,799,313 B2 | 8/2014 | Satlow | |
| 8,807,948 B2 | 8/2014 | Luo et al. | |
| 8,855,999 B1 | 10/2014 | Elliot | |
| 8,903,717 B2 | 12/2014 | Elliot | |
| 8,930,874 B2 | 1/2015 | Duff et al. | |
| 8,930,897 B2 | 1/2015 | Nassar | |
| 8,938,686 B1 | 1/2015 | Erenrich et al. | |
| 8,984,390 B2 | 3/2015 | Aymeloglu et al. | |
| 9,009,827 B1 | 4/2015 | Albertson et al. | |
| 9,058,315 B2 | 6/2015 | Burr et al. | |
| 9,165,100 B2 | 10/2015 | Begur et al. | |
| 9,201,920 B2 | 12/2015 | Jain et al. | |
| 9,223,773 B2 | 12/2015 | Isaacson | |
| 9,589,014 B2 | 3/2017 | Jain et al. | |
| 10,248,722 B2 * | 4/2019 | Leblanc | G06F 17/2785 |
| 2002/0032677 A1 | 3/2002 | Morgenthaler et al. | |
| 2002/0095360 A1 | 7/2002 | Joao | |
| 2002/0103705 A1 | 8/2002 | Brady | |
| 2002/0194201 A1 | 12/2002 | Wilbanks et al. | |
| 2002/0196229 A1 | 12/2002 | Chen et al. | |
| 2003/0036927 A1 | 2/2003 | Bowen | |
| 2003/0093755 A1 | 5/2003 | O'Carroll | |
| 2003/0126102 A1 | 7/2003 | Borthwick | |
| 2003/0172053 A1 | 9/2003 | Fairweather | |
| 2003/0177112 A1 | 9/2003 | Gardner | |
| 2004/0034570 A1 | 2/2004 | Davis | |
| 2004/0044648 A1 | 3/2004 | Anfindsen et al. | |
| 2004/0044992 A1 | 3/2004 | Muller et al. | |
| 2004/0083466 A1 | 4/2004 | Dapp et al. | |
| 2004/0205492 A1 | 10/2004 | Newsome | |
| 2004/0221223 A1 | 11/2004 | Yu et al. | |
| 2004/0236688 A1 | 11/2004 | Bozeman | |
| 2004/0236711 A1 | 11/2004 | Nixon et al. | |
| 2005/0010472 A1 | 1/2005 | Quatse et al. | |
| 2005/0028094 A1 | 2/2005 | Allyn | |
| 2005/0039116 A1 | 2/2005 | Slack-Smith | |
| 2005/0039119 A1 | 2/2005 | Parks et al. | |
| 2005/0091186 A1 | 4/2005 | Elish | |
| 2005/0091420 A1 | 4/2005 | Snover et al. | |
| 2005/0125715 A1 | 6/2005 | Franco et al. | |
| 2005/0183005 A1 | 8/2005 | Denoue et al. | |
| 2006/0026561 A1 | 2/2006 | Bauman et al. | |
| 2006/0031779 A1 | 2/2006 | Theurer et al. | |
| 2006/0053097 A1 | 3/2006 | King et al. | |
| 2006/0053170 A1 | 3/2006 | Hill et al. | |
| 2006/0059423 A1 | 3/2006 | Lehmann et al. | |
| 2006/0080139 A1 | 4/2006 | Mainzer | |
| 2006/0123027 A1 | 6/2006 | Kohlhammer et al. | |
| 2006/0129746 A1 | 6/2006 | Porter | |
| 2006/0136513 A1 | 6/2006 | Ngo et al. | |
| 2006/0143075 A1 | 6/2006 | Carr et al. | |
| 2006/0155654 A1 | 7/2006 | Plessis et al. | |
| 2006/0178915 A1 | 8/2006 | Chao | |
| 2006/0218163 A1 | 9/2006 | Marcjan et al. | |
| 2006/0265417 A1 | 11/2006 | Amato et al. | |
| 2006/0277460 A1 | 12/2006 | Forstall et al. | |
| 2007/0000999 A1 | 1/2007 | Kubo et al. | |
| 2007/0043686 A1 | 2/2007 | Teng et al. | |
| 2007/0061752 A1 | 3/2007 | Cory | |
| 2007/0074169 A1 | 3/2007 | Chess et al. | |
| 2007/0078872 A1 | 4/2007 | Cohen | |
| 2007/0112714 A1 | 5/2007 | Fairweather | |
| 2007/0113164 A1 | 5/2007 | Hansen et al. | |
| 2007/0118357 A1 | 5/2007 | Kasravi et al. | |
| 2007/0136095 A1 | 6/2007 | Weinstein | |
| 2007/0168871 A1 | 7/2007 | Jenkins | |
| 2007/0185850 A1 | 8/2007 | Walters et al. | |
| 2007/0233709 A1 | 10/2007 | Abnous | |
| 2007/0245339 A1 | 10/2007 | Bauman et al. | |
| 2007/0284433 A1 | 12/2007 | Domenica et al. | |
| 2007/0299697 A1 | 12/2007 | Friedlander et al. | |
| 2008/0016155 A1 | 1/2008 | Khalatian | |
| 2008/0091693 A1 | 4/2008 | Murthy | |
| 2008/0103830 A1 | 5/2008 | Apacible et al. | |
| 2008/0109714 A1 | 5/2008 | Kumar et al. | |
| 2008/0140387 A1 | 6/2008 | Linker | |
| 2008/0148398 A1 | 6/2008 | Mezack et al. | |
| 2008/0172607 A1 | 7/2008 | Baer | |
| 2008/0177782 A1 | 7/2008 | Poston et al. | |
| 2008/0228467 A1 | 9/2008 | Womack et al. | |
| 2008/0249820 A1 | 10/2008 | Pathria | |
| 2008/0281580 A1 | 11/2008 | Zabokritski | |
| 2008/0313132 A1 | 12/2008 | Hao et al. | |
| 2008/0313243 A1 | 12/2008 | Poston et al. | |
| 2009/0031401 A1 | 1/2009 | Cudich et al. | |
| 2009/0043801 A1 | 2/2009 | LeClair | |
| 2009/0089651 A1 | 4/2009 | Herberger et al. | |
| 2009/0106178 A1 | 4/2009 | Chu | |
| 2009/0112678 A1 | 4/2009 | Luzardo | |
| 2009/0112745 A1 | 4/2009 | Stefanescu | |
| 2009/0150868 A1 | 6/2009 | Chakra et al. | |

(56) References Cited

U.S. PATENT DOCUMENTS

| | | |
|---|---|---|
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0011282 A1 | 1/2010 | Dollard et al. |
| 2010/0057622 A1 | 3/2010 | Faith et al. |
| 2010/0070844 A1 | 3/2010 | Aymeloglu et al. |
| 2010/0098318 A1 | 4/2010 | Anderson |
| 2010/0204983 A1 | 8/2010 | Chung et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0313119 A1 | 12/2010 | Baldwin et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce et al. |
| 2011/0099133 A1 | 4/2011 | Chang et al. |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2011/0258216 A1 | 10/2011 | Supakkul et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0137235 A1 | 5/2012 | TS et al. |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0284670 A1 | 11/2012 | Kashik et al. |
| 2012/0304150 A1 | 11/2012 | Leithead et al. |
| 2013/0016106 A1 | 1/2013 | Yip et al. |
| 2013/0024268 A1 | 1/2013 | Manickavelu |
| 2013/0054286 A1 * | 2/2013 | Oberhofer .............. G06Q 10/00 705/7.11 |
| 2013/0086482 A1 | 4/2013 | Parsons |
| 2013/0091084 A1 | 4/2013 | Lee |
| 2013/0124193 A1 | 5/2013 | Holmberg |
| 2013/0151305 A1 | 6/2013 | Akinola et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0225212 A1 | 8/2013 | Khan |
| 2013/0251233 A1 | 9/2013 | Yang et al. |
| 2013/0275446 A1 | 10/2013 | Jain et al. |
| 2014/0047319 A1 | 2/2014 | Eberlein |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0358829 A1 | 12/2014 | Hurwitz |
| 2015/0026622 A1 | 1/2015 | Roaldson et al. |
| 2015/0046481 A1 | 2/2015 | Elliot |
| 2015/0073954 A1 | 3/2015 | Braff |
| 2015/0089353 A1 | 3/2015 | Folkening |
| 2015/0100559 A1 | 4/2015 | Nassar |
| 2015/0106379 A1 | 4/2015 | Elliot et al. |
| 2015/0142704 A1 | 5/2015 | London |
| 2015/0142766 A1 | 5/2015 | Jain et al. |
| 2015/0212663 A1 | 7/2015 | Papale et al. |
| 2015/0254220 A1 | 9/2015 | Burr et al. |
| 2015/0261847 A1 | 9/2015 | Ducott et al. |
| 2016/0062555 A1 | 3/2016 | Ward et al. |
| 2016/0321245 A1 | 11/2016 | Chisholm et al. |
| 2017/0177634 A1 | 6/2017 | Jain et al. |
| 2017/0242922 A1 | 8/2017 | Leblanc et al. |

FOREIGN PATENT DOCUMENTS

| | | |
|---|---|---|
| CA | 2666364 | 1/2015 |
| CN | 102054015 | 5/2014 |
| DE | 102014204840 | 9/2014 |
| DE | 102014215621 | 2/2015 |
| EP | 1672527 | 6/2006 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 2993595 | 3/2016 |
| EP | 3062245 | 8/2016 |
| EP | 3208726 | 8/2017 |
| EP | 2084597 | 10/2018 |
| GB | 2366498 | 3/2002 |
| GB | 2513007 | 10/2014 |
| GB | 2518745 | 4/2015 |
| IL | 198253 | 12/2009 |
| NL | 2013306 | 2/2015 |
| WO | WO01/025906 | 4/2001 |
| WO | WO 2001/088750 | 11/2001 |
| WO | 2002/035376 | 5/2002 |
| WO | WO 2003/060751 | 7/2003 |
| WO | WO 2007/133206 | 11/2007 |
| WO | WO 2008/064207 | 5/2008 |
| WO | WO2008/064207 A2 | 5/2008 |
| WO | WO 2010/030913 | 3/2010 |
| WO | WO 2010/030914 | 3/2010 |
| WO | WO 2011/071833 | 6/2011 |
| WO | WO 2012/119008 | 9/2012 |

OTHER PUBLICATIONS

Bruijn et al., "D4.2.1 State-of-the-art survey on Ontology Merging and Aligning V1", 2004.*

Ruiz et al., "Supporting Concurrent Ontology Development Framework, Algorithms and Tool", 2010.*

Chen et al., "A Collaborative Ontology Construction Tool with Conflicts Detection", 2008 (Year: 2008).*

Park et al., Semantic conflict resolution ontology (SCROL): an ontology for detecting and resolving data and schema-level semantic conflicts (Year: 2004).*

S. Klemmer et al., "Where Do Web Sites Come From? Capturing and Interacting with Design History," Association for Computing Machinery, CHI 2002 Apr. 20-25, 2002, 8 pages.

A. Kokossi, ed., "D7 Dynamic Ontology Management System (Design)," Information Societies Technology Programme, Jan. 10, 2002, 27 pages.

M. Niepert et al., "A Dynamic Ontology for a Dynamic Reference Work," Association for Computing Machinery, JCDL '07 Jun. 17-22, 2007, 10 pages.

Anonymous, "BackTuIT—JD Edwards One World Version Control System," downloaded Jul. 23, 2007, 1 page.

G. Miklau et al., "Securing history: Privacy and accountability in database systems," 3rd Biennial Conference on Innovative Data Systems Research (CIDR), Jan. 7-10, 2007, 10 pages.

International Searching Authority, "International Search Report", International application No. PCT/US07/85202, dated May 22, 2008, 9 pages.

(56) References Cited

OTHER PUBLICATIONS

Claims, International application No. PCT/US07/85202, 6 pages, dated May 2008.
The International Bureau of WIPO, "Search Report" in application No. PCT/US2007/085202, dated Jun. 4, 2009, 9 pages.
Claims in application No. PCT/US2007/085202, dated Jun. 2009, 6 pages.
Australian Patent Office, "Search Report" in application No. AU2007323689, dated Mar. 22, 2011, 6 pages.
Claims in Australian Application No. AU2007323689, dated Mar. 2011, 6 pages.
State of Israel Ministry of Justice, The Patent Office, Notification of Defects in Patent Application No. 198253, dated Nov. 24, 2014, 4 pages.
Claims in Israel Application No. 198253, dated Nov. 2014, 8 pages.
"A Tour of Pinboard," <http://pinboard.in/tour> as printed May 15, 2014 in 6 pages.
Delicious, <http://delicious.com/> as printed May 15, 2014 in 1 page.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.
Johnson, Maggie "Introduction to YACC and Bison".
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Nivas, Tuli, "Test Harness and Script Design Principles for Automated Testing of non-GUI or Web Based Applications," Performance Lab, Jun. 2011, pp. 30-37.
Official Communication for European Patent Application No. 14159629.6 dated Jul. 31, 2014.
Official Communication for Great Britain Patent Application No. 1404479.6 dated Aug. 12, 2014.
Official Communication for New Zealand Patent Application No. 622497 dated Mar. 26, 2014.
Official Communication for New Zealand Patent Application No. 622497 dated Jun. 19, 2014.
Official Communication for New Zealand Patent Application No. 622389 dated Mar. 20, 2014.
Official Communication for New Zealand Patent Application No. 622404 dated Mar. 20, 2014.
Official Communication for European Patent Application No. 14158977.0 dated Jun. 10, 2014.
Official Communication for New Zealand Patent Application No. 622414 dated Mar. 24, 2014.
Official Communication for New Zealand Patent Application No. 622484 dated Apr. 2, 2014.
Official Communication for Canadian Patent Application No. 2666364 dated Jun. 4, 2012.
Official Communication for New Zealand Patent Application No. 622513 dated Apr. 3, 2014.
Official Communication for Israel Patent Application No. 198253 dated Nov. 24, 2014.
Official Communication for Great Britain Patent Application No. 1413935.6 dated Jan. 27, 2015.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Bluttman et al., "Excel Formulas and Functions for Dummies," 2005, Wiley Publishing, Inc., pp. 280, 284-286.
Conner, Nancy, "Google Apps: The Missing Manual," May 1, 2008, pp. 15.
Galliford, Miles, "SnagIt Versus Free Screen Capture Software: Critical Tools for Website Owners," <http://www.subhub.com/articles/free-screen-capture-software>, Mar. 27, 2008, pp. 11.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Kwout, <http://web.archive.org/web/20080905132448/http://www.kwout.com/> Sep. 5, 2008, pp. 2.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Microsoft Windows, "Microsoft Windows Version 2002 Print Out 2," 2002, pp. 1-6.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, <http://oreilly.com/digitalmedia/2006/01/01/mac-os-x-screenshot-secrets.html> published Jan. 1, 2006 in 10 pages.
Schroder, Stan, "15 Ways to Create Website Screenshots," <http://mashable.com/2007/08/24/web-screenshots/>, Aug. 24, 2007, pp. 2.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.
Official Communication for New Zealand Patent Application No. 622473 dated Mar. 27, 2014.
Official Communication for New Zealand Patent Application No. 622473 dated Jun. 19, 2014.

(56) References Cited

OTHER PUBLICATIONS

Official Communication for New Zealand Patent Application No. 628161 dated Aug. 25, 2014.
Official Communication for Australian Patent Application No. 2013251186 dated Mar. 12, 2015.
Claims in Australian Patent Application No. 2013251186 dated Mar. 2015, 7 pages.
Chaudhuri et al., "An Overview of Business Intelligence Technology," Communications of the ACM, Aug. 2011, vol. 54, No. 8.
Wang et al., "Research on a Clustering Data De-Duplication Mechanism Based on Bloom Filter," IEEE 2010, 5 pages.
Derong et al., "Heterogeneity Resolution Based on Ontology in Web Services Composition," IEEE, vol. 329, Aug. 1, 2015, 4 pages.
Fahad et al., "Towards Ensuring Satisfiability of Merged Ontology," International Conference on Computational Science, ICCS, 2011, 10 pages.
Panov et al., "Generic Ontology of Datatypes," Information Sciences, Elsevier Inc, 2015, 21 pages.
Symantec Corporation, "E-Security Begins with Sound Security Policies," Announcement Symantec, Jun. 14, 2001.
Official Communication for Australian Patent Application No. 2014201506 dated Feb. 27, 2015.
Official Communication for Australian Patent Application No. 2014201511 dated Feb. 27, 2015.
Official Communication for Netherlands Patent Application No. 2013306 dated Apr. 24, 2015.
Official Communication for Great Britain Patent Application No. 1404479.6 dated Jul. 9, 2015.
Official Communication for Great Britain Patent Application No. 1413935.6 dated Dec. 21, 2015.
Official Communication for European Patent Application No. 16157174.0 dated Jul. 5, 2016.
Claims for European Patent Application No. 16157174.0 dated Jul. 2016, 3 pages.
Official Communication for Netherlands Patent Application No. 2012438 dated Sep. 21, 2015.
Official Communication for European Patent Application No. 12181585.6 dated Sep. 4, 2015.
Official Communication for Canadian Patent Application No. 2831660 dated Jun. 9, 2015.
Official Communication for Netherlands Patent Application No. 2011729 dated Aug. 13, 2015.
Official Communication for European Patent Application No. 15190307.7 dated Feb. 19, 2016.
Official Communication for European Patent Application No. 15188106.7 dated Feb. 3, 2016.
Official Communication for Israel Patent Application No. 198253 dated Jan. 12, 2016.
Official Communication for Netherlands Patent Application No. 2012434 dated Jan. 8, 2016.
Official Communication for Australian Patent Application No. 2014201507 dated Feb. 27, 2015.
Official Communication for European Patent Application No. 14158977.0 dated Apr. 16, 2015.
Official Communication for European Patent Application No. 14158958.0 dated Apr. 16, 2015.
U.S. Appl. No. 14/222,364, filed Mar. 21, 2014, Office Action, dated Dec. 9, 2015.
U.S. Appl. No. 14/883,498, filed Oct. 14, 2015, First Office Action Interview, dated Dec. 24, 2015.
U.S. Appl. No. 14/841,338, filed Aug. 31, 2015, Office Action, dated Feb. 18, 2016.
U.S. Appl. No. 14/571,098, filed Dec. 15, 2014, First Office Action Interview, dated Nov. 10, 2015.
U.S. Appl. No. 14/842,734, filed Sep. 1, 2015, First Office Action Interview, dated Nov. 19, 2015.
U.S. Appl. No. 14/800,447, filed Jul. 15, 2012, First Office Action Interview, dated Dec. 10, 2010.
U.S. Appl. No. 12/556,321, filed Sep. 9, 2009, Final Office Action, dated Feb. 25, 2016.
U.S. Appl. No. 14/265,637, filed Apr. 30, 2014, Notice of Allowance, dated Feb. 13, 2015.
U.S. Appl. No. 14/571,098, filed Dec. 15, 2014, First Office Action Interview, dated Aug. 24, 2015.
U.S. Appl. No. 14/552,336, filed Nov. 24, 2014, Notice of Allowance, dated Nov. 3, 2015.
U.S. Appl. No. 13/827,491, filed Mar. 14, 2013, Final Office Action, dated Jun. 22, 2015.
U.S. Appl. No. 13/827,491, filed Mar. 14, 2013, Office Action, dated Oct. 9, 2015.
U.S. Appl. No. 14/571,098, filed Dec. 15, 2014, First Office Action Interview, dated Aug. 5, 2015.
U.S. Appl. No. 12/556,321, filed Sep. 9, 2009, Office Action, dated Jul. 7, 2015.
U.S. Appl. No. 14/741,256, filed Jun. 16, 2015, Office Action, dated Feb. 9, 2016.
U.S. Appl. No. 14/225,006, filed Mar. 25, 2014, Advisory Action, dated Dec. 21, 2016.
U.S. Appl. No. 14/571,098, filed Dec. 15, 2014, First Office Action Interview, dated Mar. 11, 2015.
U.S. Appl. No. 14/508,696, filed Oct. 7, 2014, Office Action, dated Mar. 2, 2015.
U.S. Appl. No. 14/138,568, filed Jan. 6, 2014, Final Office Action, dated Oct. 22, 2014.
U.S. Appl. No. 14/148,568, filed Jan. 6, 2014, Office Action, dated Mar. 26, 2015.
U.S. Appl. No. 14/148,568, filed Jan. 6, 2014, Notice of Allowance, dated Aug. 26, 2015.
U.S. Appl. No. 14/533,433, filed Nov. 5, 2014, Notice of Allowance, dated Sep. 1, 2015.
U.S. Appl. No. 13/669,274, filed Nov. 5, 2012, Advisory Action, dated Aug. 26, 2015.
U.S. Appl. No. 13/669,274, filed Nov. 5, 2012, Final Office Action, dated May 6, 2015.
U.S. Appl. No. 14/025,653, filed Sep. 12, 2013, First Office Action Interview, dated Oct. 6, 2015.
U.S. Appl. No. 14/134,558, filed Dec. 19, 2013, Office Action, dated Oct. 7, 2015.
U.S. Appl. No. 14/025,653, filed Sep. 12, 2013, Interview Summary, dated Mar. 3, 2016.
U.S. Appl. No. 14/871,465, filed Sep. 30, 2015, First Office Action Interview, dated Feb. 9, 2016.
U.S. Appl. No. 14/715,834, filed May 19, 2015, First Office Action Interview, dated Feb. 29, 2016.
U.S. Appl. No. 14/954,680, filed Nov. 30, 2015, Office Action, dated May 12, 2016.
U.S. Appl. No. 14/631,633, filed Feb. 25, 2015, First Office Action Interview, dated Feb. 3, 2016.
Official Communication for Australian Patent Application No. 2014201580 dated Feb. 27, 2015.
Official Communication for European Patent Application No. 14158958.0 dated Jun. 3, 2014.
Maluf et al., "An Extenible Schema-Less Database Framework for Managing High-Throughpit Structured Documents," Proceedings of the IASTED International Conference, Computerscience, and Technology, May 21, 2003, pp. 225-230.
Zhuhadar et al., "Multi-lanugage Ontology-Based Search Engine," Advances in Computer-Human Interactions, 2010, ACHI '10, Third International Conference on, IEEE, Piscataway, New Jersey, USA, Feb. 10, 2010, pp. 13-18.
Monitel-Ponsoda et al., "Style Guidelines for Naming and Labeling Ontologies in the Multilingual Web," Proc. Int'l Conf. on Dublin Core and Metadata Applications, Jan. 31, 2011, pp. 105-111.
Official Communication for European Patent Application No. 07864644.5 dated Jul. 12, 2016.
Notice of Acceptance for Australian Patent Application No. 2013251186 dated Nov. 6, 2015.
Official Communication for Canadian Patent Application No. 2666364 dated Oct. 3, 2013.
Davis K H Ed—Wills L et al.: "Combining a Flexible Data Model and Phase Schema Translations in Data Model Reverse Engineering," Reverse Engineering, 1996, Proceedings of the Third Working Conference, Monterey, CA, USA, Nov. 8-10, 1996, pp. 141-151.

(56) References Cited

OTHER PUBLICATIONS

Official Communication for European Patent Application No. 15155845.9 dated Oct. 6, 2015.
Palantir, https://docs.palantir.com/gotham/3.11.1.0/dataguide/baggage/KiteSchema printed Aug. 30, 2013 in 1 page.
Official Communication for European Patent Application No. 17152510.8 dated Apr. 19, 2017.
Official Communication for Israel Patent Application No. 198253 dated Nov. 27, 2013.
Karljurand et al., "A Multilingual Semantic Wiki Based on Attempto Controlled English and Grammatical Framework," May 26, 2013, The Semantic Web: Semantics and Big Data, pp. 427-441.
Official Communication for European Patent Application No. 18200807.8 dated Feb. 11, 2019.
European Patent Office, "Search Report" in application No. 16 157 174.0-1217, dated Nov. 6, 2018, 4 pages.
European Claims in application No. 16 157 174.0-1217, dated Nov. 2018, 3 pages.
U.S. Appl. No. 14/715,834, filed May 19, 2015, First Office Action Interview, dated Feb. 19, 2016.
U.S. Appl. No. 15/050,263, filed Feb. 22, 2016, Office Action, dated Apr. 30, 2018.
U.S. Appl. No. 15/050,263, filed Feb. 22, 2016, Notice of Allowance, dated Dec. 5, 2018.

\* cited by examiner

SYSTEM WITH METHODOLOGY FOR DYNAMIC MODULAR ONTOLOGY

RELATED APPLICATION(S)

This application is related to U.S. patent application Ser. No. 11/602,626, "Creating Data In A Data Store Using A Dynamic Ontology", filed Nov. 20, 2006, which is incorporated by reference herein in its entirety.

TECHNICAL FIELD

Some embodiments of the present invention relate generally to data modeling using computer systems, and more particularly, to a methodology for modeling information on a computer system using a dynamic modular ontology.

BACKGROUND

Computers are very powerful tools for organizing vast amounts of information. An ontology is a common mechanism for organizing information on computer systems. A typical ontology is a categorization (modeling) of information stored as "objects" (e.g., documents, entities, and events), "properties" of data objects, and "relationships" between objects. An ontology is sometimes referred to as a "schema" or a "taxonomy".

As an example, an ontology may be used to model the concept of a person's occupation in different ways. For example, a person's job function could be classified using different object definitions. For example, a "person" object may be further sub-defined as an "airline pilot" object, a "doctor" object, or a "lawyer" object. A person's occupation could also be modeled with an "occupation" property of an object, or by a relationship between two objects such as, for example, a "flies" relationship between a "person" object and a "plane" object.

In some cases, an ontology is dynamic in the sense that it can be modified even after it has been applied to model information on a computer system. For example, a dynamic ontology may allow an object, property, or relationship in the ontology that is not currently used to model information to be deleted from the ontology, a new object, property, or relationship to be added to the ontology, and an existing object, property, or relationship in the ontology to be modified. For example, an organization may model the concept of a person's occupation in a dynamic ontology at a first time with a "doctor" object and thereafter model the person's occupation with an "occupation" property of an object. Using a dynamic ontology, an organization can build an information model that is appropriate for their particular domain but that can still evolve with the organization over time. Examples of a dynamic ontology in a computer system are described in related U.S. patent application Ser. No. 11/602,626, "Creating Data In A Data Store Using A Dynamic Ontology", filed Nov. 20, 2006, the entire contents of which is hereby incorporated by reference.

As the amount of information organized by ontologies becomes larger, and the number of domains of expertise within a given organization increases, it has become a significant challenge for organizations to easily model their data on computer systems using ontologies. The challenge is particularly significant for large investigative organizations such as law enforcement agencies, healthcare delivery organizations, intelligence organizations, defense, and other organizations that have teams of users (e.g., investigative analysts) with different domains of expertise, possibly working in disparate geographic locations. Within such organizations, coordination and agreement among users on how to model information on a computer system using an ontology can be difficult, if not impractical.

Many conventional ontologies are also monolithic in design. This may prevent a first team of users that have built an ontology for their data from sharing the ontology definition with a second team of users that is working with the same information or the same type of information in a way that allows the second team to easily apply the ontology definition to their data. In some cases, the second team may be required to build their own ontology from scratch even if the ontology is the same or similar the ontology built by the first team. Such rework is tedious and time consuming to most users. In a worst case, the second team may not have the expertise of the first team needed to build the ontology from scratch.

The problem of conventional monolithic ontologies is exacerbated when the ontologies are dynamic. In this situation, the monolithic design of the ontologies may prevent ongoing modifications to one ontology definition from being easily incorporated into another ontology definition. For example, even if two teams of users agree on a change to how certain information should be modeled, both teams may be required to independently modify their respective ontology definitions to reflect the data modeling change. Such duplicate work is frustrating to most users.

Accordingly, there is a need for a computer system with methodologies for more easily building and maintaining ontologies, including dynamic ontologies. Such methodologies increase the effectiveness, efficiency, and user satisfaction with activities like modeling investigative information on computer systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims section at the end of this document provides a useful summary of some embodiments of the present invention.

DETAILED DESCRIPTION

Figure 1:
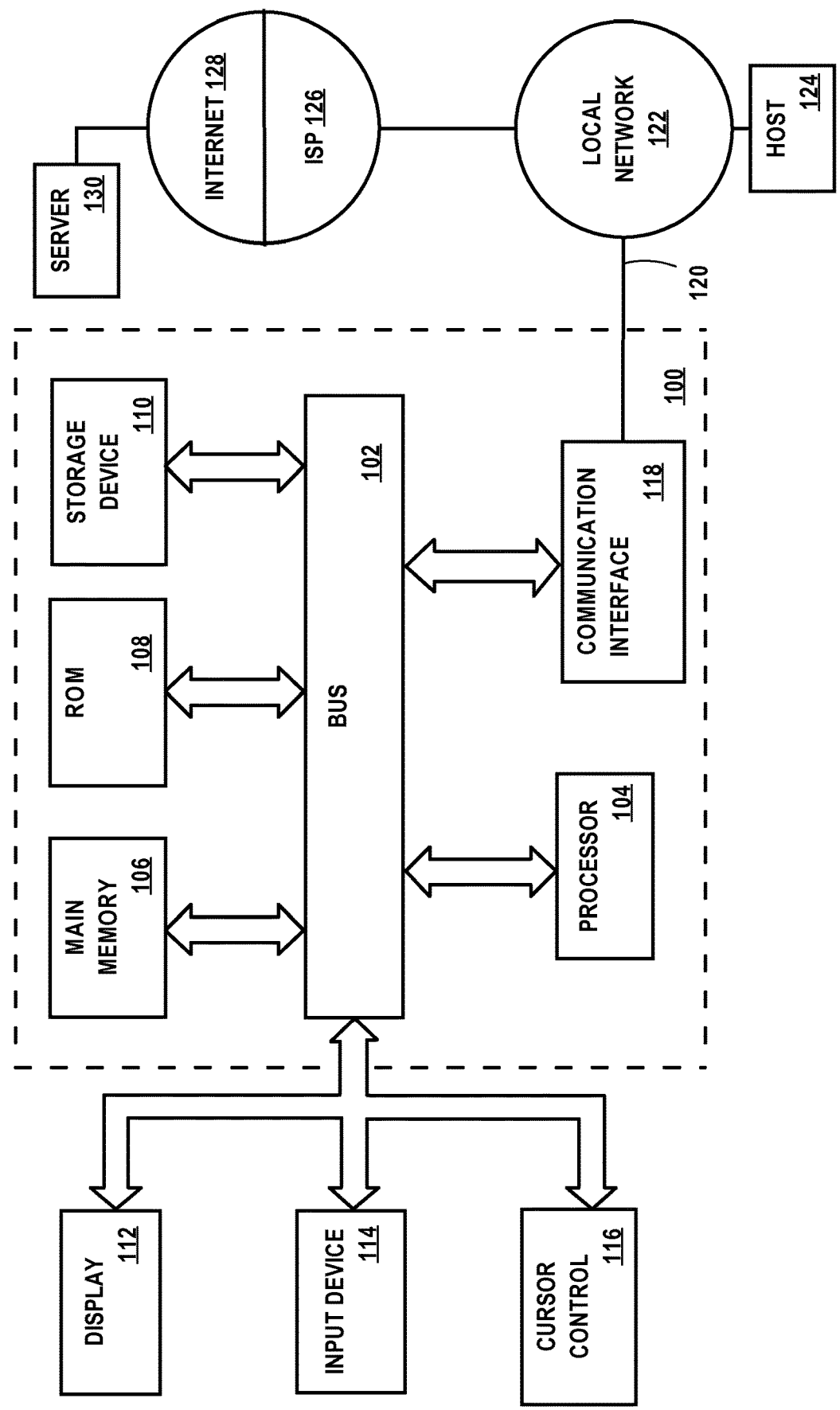
FIG. 1 is a very general block diagram of an example computing device which may be used for implementing some embodiments of the present invention.

In the following description, for the purposes of explanation, numerous specific details are set forth in order to provide a thorough understanding of some embodiments of the present invention. It will be apparent, however, that some embodiments of the present invention can be practiced without these specific details. In other instances, well-known structures and devices are shown in block diagram form in order to avoid unnecessarily obscuring some embodiments of the present invention. As to the flowcharts, each block within the flowcharts represents both a method step and an apparatus element for performing the method step. Depending upon the requirements of the particular implementation at hand, the corresponding apparatus element may be configured in hardware, software, firmware or combinations thereof.

It will also be understood that, although the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the present invention. The first device and the second device are both devices, but they are not the same device.

The terminology used herein is for the purpose of describing particular implementations only and is not intended to be limiting of the claims. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising", when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1.0 Overview

An analyst conducting an investigation on data may need the ability to model various types of data from highly structured data, such as data stored in a relational database, to completely unstructured data, such as free-form text documents. Further, the analyst may need to be able to model data in various different domains of expertise. A data modeling approach with only a single data model that is unable to change with the evolution of an organization and its tasks may not adequately meet the analyst's needs.

According to some embodiments of the present invention, a "dynamic modular ontology" is introduced as a software "cushion" between a data repository storing investigative data and end-user analysts. A dynamic modular ontology allows the end-users to interact with investigative data as data objects defined in the data model, regardless of the original format of the investigative data.

According to some embodiments of the present invention, a dynamic modular ontology is composed of a number of basic building blocks that an analyst may use to define a domain-specific data model. The basic building blocks may include "data objects", "properties", and "links", among other possible basic building blocks. For example, the basic building blocks may also include "notes".

A "data object" may be defined as a container for data and represents a thing in the real world such as, for example, an entity (e.g. a person, a place, an organization, or other noun), an event (e.g., something that happens at a point in time or for a duration), a document (e.g., a unstructured data source, an e-mail message, a news report, and the like), or a multimedia object (e.g., a rich-media type, video, audio, images, and the like). According to some embodiments, a data object itself comprises a display name and a unique identifier and otherwise does not hold investigative data. Instead, a data object may have one or more "object components" (e.g., properties, links, and notes), which can be multiple. For example, a "person" data object can have multiple "name" properties.

A "property" may be defined as an attribute of a data object. A property may represent individual investigative data items such as a name of a person or a phone number, as just some examples.

A "link" may be defined as a connection between data objects. Various types of connections are possible. For example, a link may represent a familial relationship between two persons or membership relationship between a person and a religious organization.

A "note" may be defined as free-form text entered by an analyst and associated with a data object.

At the level of these basic building blocks, a dynamic modular ontology may be virtually free of semantics. For example, there may be no inherent meaning associated with a relationship between two data objects or with a particular property on a data object. According to some embodiments of the present invention, an analyst may flexibly use these basic building blocks to model a particular problem domain at hand by choosing the meaning of data types defined in a dynamic modular ontology.

An ontology may be defined generally as a categorization of the world. According to some embodiments of the present invention, a dynamic modular ontology is a categorization of a particular investigative world. For example, the particular investigative world may be in a health care domain, a legal domain, a financial analysis domain, a city or state police domain, an intelligence domain, or other specific domain in which investigations on data are conducted by analysts with particular expertise in the specific domain. Domain-specific types of data objects, properties, and links may be defined in a dynamic modular ontology to support the analysts in a particular field of expertise. A dynamic modular ontology may be considered dynamic because, according to some embodiments of the present invention, the dynamic modular ontology can be customized to meet the specific needs of an investigative organization and can be changed as the organization and its assignments evolve. A dynamic modular ontology may be considered modular because, according to some embodiments of the present invention, multiple smaller dynamic modular ontologies (referred to herein as "ontology modules") may be defined independently of each other and then combined together to form a larger more comprehensive dynamic modular ontology.

According to some embodiments of the present invention, ontology modules support inheritance, thereby making it easier to both re-use existing ontology modules and extend ontology modules as needed to define to new ontology modules with specialized data modeling behavior. For example, according to some embodiments of the present invention, an ontology module that models arrests can combined with another ontology module that models warrants to form a dynamic modular ontology that models both arrests and warrants. As another example, according to some embodiments of the present invention, an ontology module that models arrests and warrants at the state-level may be combined with an ontology module that models arrests and warrants at the county-level and in which data object, property, and link definitions in the state-level ontology module are re-used and extended in the county-level ontology module.

According to some embodiments of the present invention, an ontology module is defined in an ontology module definition. According to some embodiments of the present invention, an ontology module definition is embodied in a human and computer readable data format such as, for example, eXtensible Markup Language (XML), JavaScript Object Notation (JSON), YAML, or the like. An ontology module definition may explicitly import other ontology module definitions for the purpose of re-using and extending data object, property, and link definitions in the imported ontology module definitions in the importing ontology module definition.

According to some embodiments of the present invention, an ontology module definition may be compiled into a dynamic modular ontology, taking into account any other ontology module definitions imported by the complied ontology module definition. The dynamic modular ontology is then used by one or more investigative analysis applications to present investigative data stored in a data repository to end-users according to the dynamic modular ontology.

Some embodiments of the present invention improve the technical field of modeling data using computers. For example, according to some embodiments of the present invention, ontology modules allow an organization to design an overall domain-specific ontology for their investigative data as a collection of independently designed sub-domain-specific ontologies which may then be combined to form the overall ontology.

Some embodiments of the present invention improve the operation of computer systems that process investigative data using ontologies. For example, according to some embodiments of the present invention, ontology modules allow a computing device to process investigative data using an overall domain-specific ontology that is formed from a composition independently designed sub-domain-specific ontologies.

These and other embodiments of the present invention are discussed in greater detail below. Before that, however, some example basic mechanisms for implementing some embodiments of the present invention will be mentioned.

2.0 Basic Implementing Mechanisms

Some embodiments of the present invention may be implemented on one or more computing devices. Such a computing device may be implemented in various forms including, but not limited to, a client, a server, a network device, a mobile device, a cell phone, a smart phone, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of some embodiments of the present invention described in this specification. Other computing devices suitable for implementing some embodiments of the present invention may have different components, including components with different connections, relationships, and functions.

2.1 Basic Computing Device

FIG. 1 is a block diagram that illustrates an example computing device 100 suitable for implementing some embodiments of the present invention. Computing device 100 includes bus 102 or other communication mechanism for addressing main memory 106 and for transferring data between and among the various components of device 100. Computing device 100 also includes one or more hardware processors 104 coupled with bus 102 for processing information. A hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory storage media accessible to processor(s) 104, render computing device 100 into a special-purpose computing device that is customized to perform the operations specified in the instructions.

Computing device 100 further includes read only memory (ROM) 108 or other static storage device coupled to bus 102 for storing static information and instructions for processor(s) 104.

One or more mass storage devices 110 are coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor(s) 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In some embodiments of the present invention, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

2.2 Basic Software System

Figure 2:
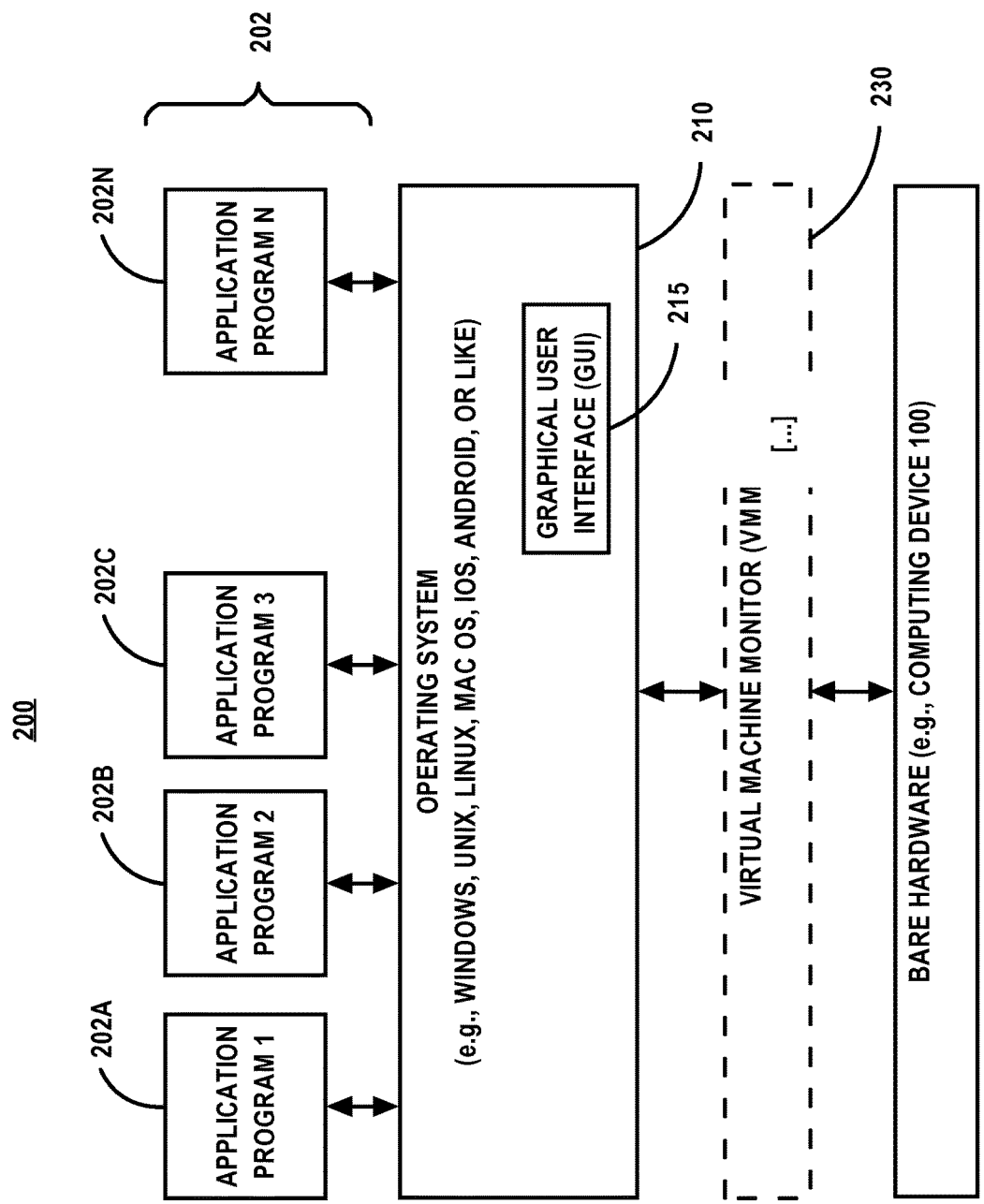
FIG. 2 is a block diagram of a software system for controlling the operation of the example computing device of FIG. 1.

FIG. 2 is a block diagram of a software system for controlling the operation of the example computing device 100 of FIG. 1. As shown, a computer software system 200 is provided for directing the operation of the computing device 100. Software system 200, which is stored in system memory (RAM) 106 and on fixed storage (e.g., hard disk) 110, includes a kernel or operating system (OS) 210. The OS 210 manages low-level aspects of computer operation, including managing execution of processes, memory allocation, file input and output (I/O), and device I/O. One or more application programs, such as client application software or "programs" 202 (e.g., 202A, 202B, 202C . . . 202N) may be "loaded" (i.e., transferred from fixed storage 110 into memory 106) for execution by the system 200. The applications or other software intended for use on the device 100 may also be stored as a set of downloadable computer-executable instructions, for example, for downloading and installation from an Internet location (e.g., Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or client application module(s) 202. The GUI 215 also serves to display the results of operation from the OS 210 and application(s) 202, whereupon the user may supply additional inputs or terminate the session (e.g., log off).

The OS 210 can execute directly on the bare hardware (e.g., processor(s) 104) 220 of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs virtual machine instances ("guest machines"). Each guest machine comprises a "guest" operating system, such as OS 210, and one or more applications, such as applications 202, designed to execute on the guest operating system. The VMM 230 presents the guest operating systems with a virtual operating platform and manages the execution of the guest operating systems. In some instances, the VMM 230 may allow a guest operating system to run as through it is running on the bare hardware 220 of the device 100 directly. In these instances, the same version of the guest operating system configured to execute on the bare hardware 104 directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing some embodiments of the present invention. Some embodiments of the present invention, however, are not necessarily limited to any particular computing environment or computing device configuration. Instead, some embodiments of the present invention may be implemented in any type of system architecture or processing environment capable of supporting the embodiments as presented in detail below.

3.0 System Architecture

Figure 3:
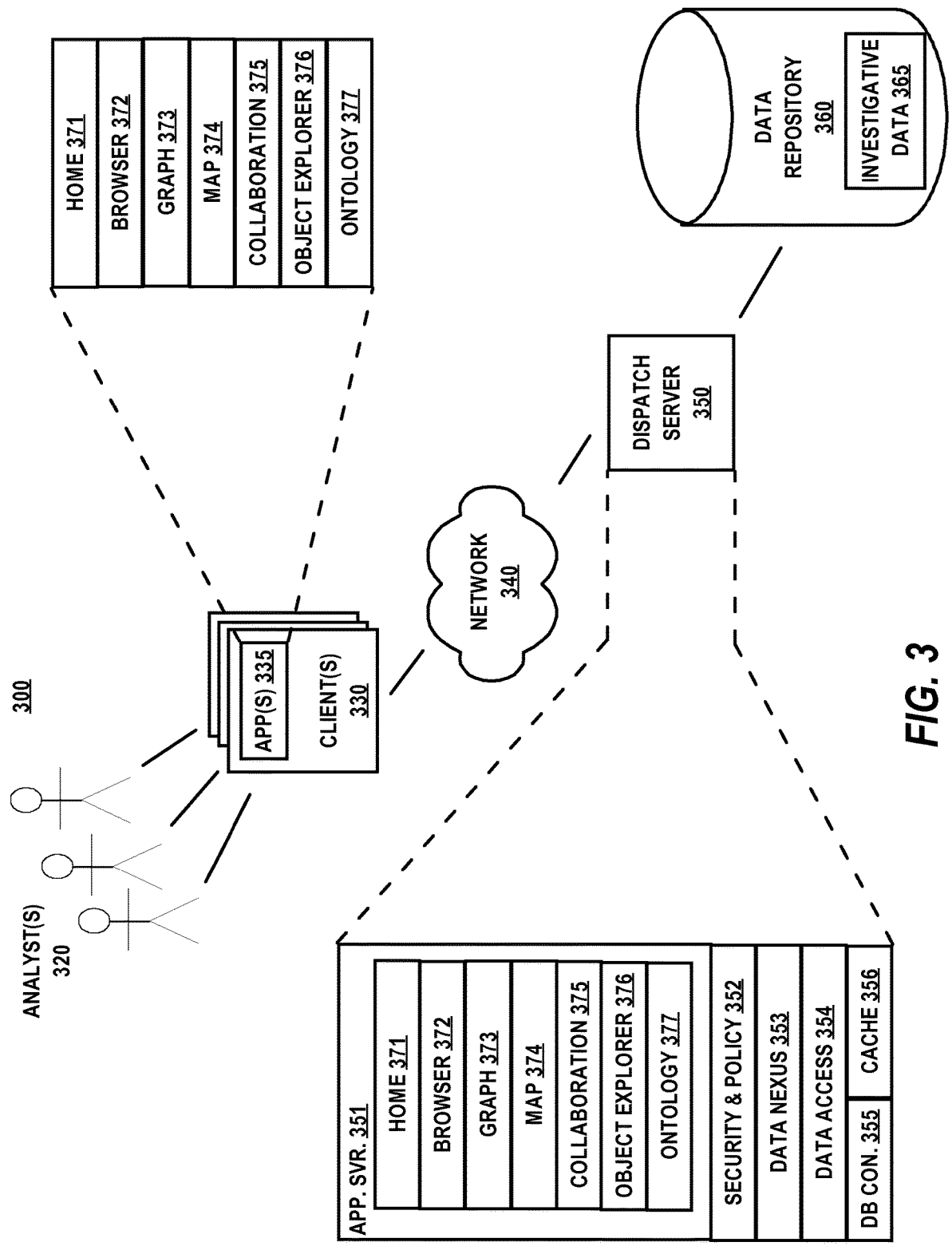
FIG. 3 is a block diagram of a distributed computing environment in which some embodiments of the present invention may be implemented.

While some embodiments of the present invention may operate within a single standalone computing device (e.g., device 100 of FIG. 1), the disclosed technologies may be implemented in a distributed computing environment. FIG. 3 is a block diagram of a distributed computing environment 300 in which the some embodiments of the present invention may be implemented.

As shown, environment 300 comprises one or more human analysts 320 that use one or more client computing devices 330 (e.g., device 100 of FIG. 1). The clients 330 are operatively coupled to one or more server computers 350 (collectively referred to herein as "dispatch server 350") by a data network 340. The dispatch server 350 is also operatively coupled to a data repository 360.

In some exemplary embodiments of the present invention, the clients 330 may themselves comprise a plurality of end-user computing devices such as the above-described device 100 that run a conventional client operating system such as MICROSOFT WINDOWS (e.g. XP, VISTA, 7, 8, etc.), MAC OS X, LINUX (e.g., UBUNTU, FEDORA, etc.), IOS, ANDROID, BLACKBERRY OS, or the like.

In some exemplary embodiments of the present invention, the dispatch server 350 comprises one or more server computing devices such as the above-described device 100 that run a conventional server operating system such as MICROSOFT WINDOWS (e.g. XP, VISTA, 7, 8, etc.), MAC OS X, LINUX (e.g., UBUNTU, FEDORA, etc.), or the like.

In some exemplary embodiments of the present invention, the data repository 360 comprises a conventional database management system such as a conventional relational database management system such as ORACLE DATABASE SERVER (e.g., 11gR2), or the like.

The dispatch server 350 may be implemented as a server computer (e.g., device 100 of FIG. 1) or as a virtual machine instance depending on the requirements of the particular implementation at hand. Where the dispatch server 350 is implemented as a virtual machine instance there still may be an underlying server computer that hosts (executes) the "virtual" server. However, there is not necessarily a one-to-one correspondence between virtual servers and server computers. For example, a server computer can host multiple virtual servers.

As used in this description and the appended claims, the singular form "server" is intended to include the plural form as well unless the context clearly indicates otherwise. For example, the dispatch server 350 may actually be implemented by multiple servers for distributed computing, concurrency, load balancing, failover, redundancy, high availability, and/or other purposes according to the requirements of the particular implementation at hand.

Network 340 may include a number of conventional wired and/or wireless network systems including, for instance, a cellular telephone network, a Local Area Network (LAN), a Wide Area Network (WAN), the Internet, and the like. The dispatch server 350 and the data repository 360 may also interconnected by a data network (not shown).

In operation, an analyst 320 uses application(s) 335 on a client 330 to access, store, and analyze (i.e., investigate) investigative data 365 stored in the data repository 360, and possibly to collaborate with other analysts 320 across organizational and/or geographical boundaries. The application(s) 335 may drive a graphical user interface that is presented at the clients 330. In some embodiments, the graphical user interface is web browser-based. For example, the graphical user interface may comprise a series of web pages displayed by a conventional web browser application.

The investigative data 365 may comprise virtually any structured (e.g., log files, spreadsheets, tables, etc.) and/or unstructured data (e.g., e-mails, documents, images, videos, etc.) that is the subject of an investigation. In some embodiments, the investigative data 365 is domain-specific. For example, the investigative data 365 may be specific to a health care domain, a financial domain, an intelligence domain, a legal domain, a law enforcement domain, or other domain in which the analysts 320 have particular expertise.

The dispatch server 350 provides a gateway to the application(s) 335 on the clients 330 for accessing and storing the investigative data 365 in the data repository 360 and connects to the data repository 360 that stores the investigative data 365. In operation, the dispatch server 350 handles business logic, manages security and policy controls, and responds to user requests as part of an investigative analysis computing platform. The application(s) 335 may include the following applications (or sets of computer-executable instructions), or a subset or a superset thereof, that an analyst 320 may use to conduct an investigation on the investigative data 365:

a home application 371;
a browser application 372;
a graph application 373;
a map application 374;
a collaboration application 375;
an object explorer application 376; and/or
an ontology application 377.

In conjunction with the hardware components (e.g., memory, disk, CPU, etc.), the operating system, and the graphical user interface of a client 330, the home application 371 may be used by an analyst 320 to start the search and investigative analysis process including: keyword searching the investigative data 365, viewing personalized news feeds, opening existing and new investigations, and editing user accounting settings.

In conjunction with the hardware components (e.g., memory, disk, CPU, etc.), the operating system, and the graphical user interface of a client 330, the browser application 372 may be used by an analyst 320 to view and apply structure to the investigative data 365 including tagging, marking, highlighting, and/or annotating particular words, text, or keywords in the investigative data 365.

In conjunction with the hardware components (e.g., memory, disk, CPU, etc.), the operating system, and the graphical user interface of a client 330, the graph application 373 may be used by an analyst 320 to visually explore semantic relationships within the investigative data 365 including: viewing the investigative data 365 as a graph of nodes and edges, filtering the graph to explore the investigative data 365, and annotating the graph for use in presentations.

In conjunction with the hardware components (e.g., memory, disk, CPU, etc.), the operating system, and the graphical user interface of a client 330, the map application 374 provides geospatial analytic capabilities to an analyst 320 including geo-mapping the investigative data 365 and geo-tagging the investigative data 365.

In conjunction with the hardware components (e.g., memory, disk, CPU, etc.), the operating system, and the graphical user interface of a client 330, the collaboration application 375 may be used by an analyst 320 to build research and discussion communities including: forming teams of analysts 320, exchanging messages with other analysts 320, sharing media rich links to the investigative data 365 with other analysts 320, and sending notification of shared graphs.

In conjunction with the hardware components (e.g., memory, disk, CPU, etc.), the operating system, and the graphical user interface of a client 330, the object explorer application 376 may be used by an analyst 320 to drill down within the investigative data 365 to arrive at interesting sub-sets of the investigative data 365 for further analysis in other applications 335 such as the graph application 373 and/or the map application 374.

In conjunction with the hardware components (e.g., memory, disk, CPU, etc.), the operating system, and the graphical user interface of a client 330, the ontology application 377 may be used by an analyst 320 to customize a dynamic modular ontology for the investigative data 365 including: adding new data object types, new property types, and new link types to ontology modules, deleting unused data object types, property types, and link types from ontology modules, combining ontology modules together to form an overall dynamic modular ontology, and resolving conflicts between combined ontology modules.

Each of the above-identified applications correspond to a set of computer-executable instructions for performing one or more functions described above. These applications (i.e., set of computer-executable instructions) need be implemented as separate software programs, procedures, or applications, and thus various subset of these applications may be combined or otherwise rearranged in some embodiments of the present invention. For example, the browser application 372 may be combined with the object explorer application 376. In some embodiments of the present invention, the application(s) 335 may comprise a subset of the applications identified above. Furthermore, the application(s) 335 may include additional applications not described above.

The dispatch server 350 may include the following applications (or sets of computer-executable instructions), or a subset or a superset thereof, that support the application(s) 335:

an application server application 351;
a security and policy application 352;
a data nexus application 353;
a data access application 354;
a database connector application 355; or
a cache application 356.

In conjunction with the hardware components (e.g., memory, disk, CPU, etc.) and the operating system of the dispatch server 350, the application server application 351 may comprise server-side components, procedures, modules, or functions of the application(s) 335. Thus, in some embodiments, an application 335 may have a client-side component, procedure, module or function that executes at the clients 330 and a server-side component, procedure, module or function that executes at the dispatch server 350.

In conjunction with the hardware components (e.g., memory, disk, CPU, etc.) and the operating system of the dispatch server 350, the security and policy application 352 enforces access control policies on the investigative data 365 and presents the investigative data 365 to the application server application 351 according to the current dynamic modular ontology in use.

In conjunction with the hardware components (e.g., memory, disk, CPU, etc.) and the operating system of the dispatch server 350, the data nexus application 353 allows pairs of dispatch server/data repository batteries to share a consistent view of their investigation data 365 through data replication.

In conjunction with the hardware components (e.g., memory, disk, CPU, etc.) and the operating system of the dispatch server 350, the data access application 354 provides an interface to the application server application 351, the security and policy application 352, and the data nexus application 353 for reading/writing the investigative data 365 from/to the data repository 360.

In conjunction with the hardware components (e.g., memory, disk, CPU, etc.) and the operating system of the dispatch server 350, the database connector application 355 allows the data access application 354 to connect to the data repository 360 over a network for the purpose of reading/writing the investigative data 365 from/to the data repository 360.

In conjunction with the hardware components (e.g., memory, disk, CPU, etc.) and the operating system of the dispatch server 350, the cache application 356 may be used by the data access application 354 to temporally store the investigative data 365 obtained from the data repository 360 for the purpose of facilitating more efficient subsequent access to the investigative data 365. In this case, the object persistence application 354 may obtain the investigative data 365 from the cache application 356 in lieu of obtaining the investigative data 365 from the data repository 360.

Each of the above-identified applications correspond to a set of computer-executable instructions for performing one or more functions described above. These applications (i.e., set of computer-executable instructions) need be implemented as separate software programs, procedures, or applications, and thus various subset of these applications may be combined or otherwise rearranged in some embodiments of the present invention. For example, the data access application 354, the database connector application 355, and the cache application 365 may be combined together in a single application. In some embodiments of the present invention, the dispatch server 350 may comprise a subset of the applications identified above. Furthermore, the dispatch server 350 may include additional applications not described above.

The above-described computer hardware and software are presented for purposes of illustrating the basic underlying computer components that may be employed for implementing some embodiments of the present invention. For purposes of discussion, the following description will present examples in which it will be assumed that there exists a "server" (e.g., dispatch server 350) that communicates with one or more "clients" (e.g., clients 330). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the embodiments of the present invention presented in detail herein.

4.0 Dynamic Modular Ontology

Figure 4A:
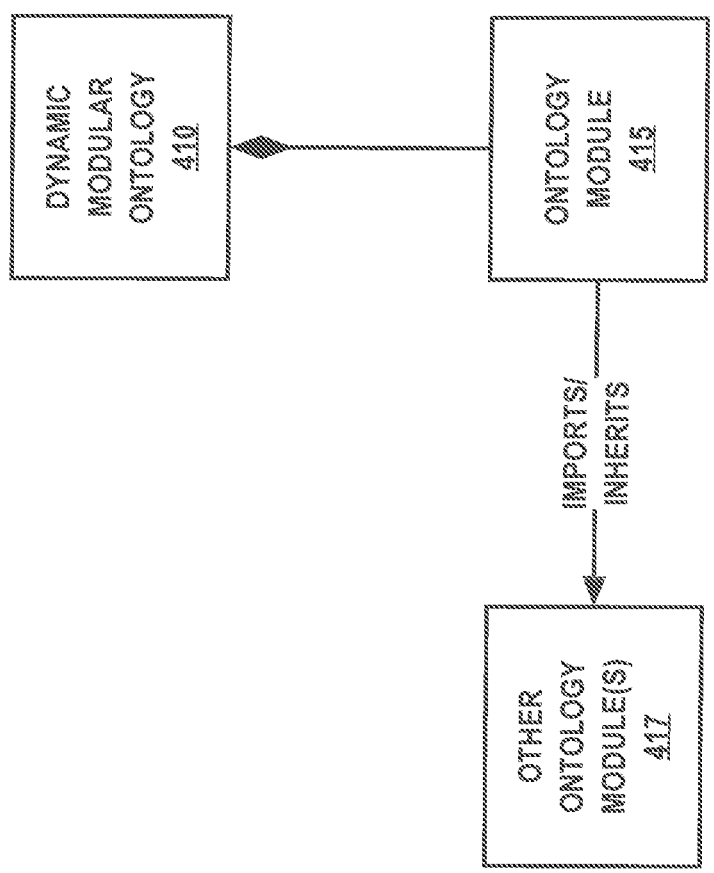
FIG. 4A is a block diagram illustrating the composition of a dynamic modular ontology according to some embodiments of the present invention.

Turning now to FIG. 4A, it is a block diagram of the composition of a dynamic modular ontology according to some embodiments of the present invention. Block 410 represents a dynamic modular ontology which is composed of an ontology module 415. The ontology module 415 may inherit data type definitions from one or more other ontology modules 417. Further, each of the one or more other ontology modules may in turn inherit data type definitions from one or more of the other ontology modules 417.

In some embodiments, an ontology module 415 and 417 is embodied in one or more files, or a compressed file archive containing the one or more files in a compressed format. In some embodiments, an ontology module 415 and 417 is represented in a human and machine readable data format such as eXtensible Markup Language (XML), JavaScript Objection Notation (JSON), YAML, or the like.

According to some embodiments of the present invention, the dispatch server 350 uses the dynamic modular ontology 410 at run-time to represent the investigative data 365 stored in data repository 360 according to a domain-specific data object model as defined by the dynamic modular ontology 410. The dynamic modular ontology 410 may comprise the following types of data type definitions, or a subset or a superset thereof:
data object type definition,
property type definition,
link type definition,
data object-property link definition, and/or
data object-data object link definition.
The above-identified types of data type definitions correspond to metadata for representing the investigative data 365 to applications (e.g., 335) that operate on the investigative data 365. This metadata may be stored in the data repository 360 in addition to the investigative data 365. For example, the data repository 365 may comprise one or more tables for storing the metadata. For example, the data repository 360 may comprise a first table for storing data object type definitions, data object-property link definitions, and data object-data object link definitions, a second table for storing property type definitions, and a third table for storing link type definitions. Furthermore, the dynamic modular ontology 410 may include additional types of data type definitions not described above.

According to some embodiments of the present invention, the ontology module 415 may inherit data type definitions from other ontology modules 417. The inheritance may be direct or transitive. For example, an ontology module A may directly inherit a data object type definition from an ontology module B, the ontology module B may directly inherit a property type definition from an ontology module C, and the ontology module A may transitively inherit the property type definition from the ontology module C. As used in this description and the appended claims, the terms "inheritance" and "inherit" by themselves are intended to encompass both direct and transitive inheritance, unless the context clearly indicates otherwise.

Figure 4B:
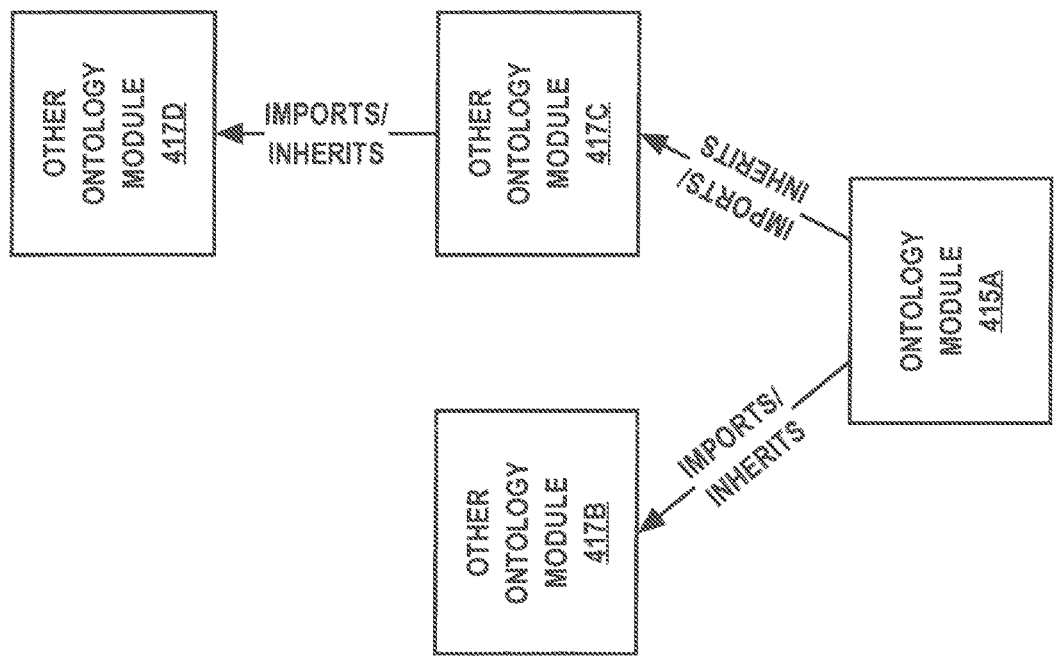
FIG. 4B is a block diagram illustrating direct and transitive inheritance between ontology modules according to some embodiments of the present invention.

According to some embodiments of the present invention, ontology module inheritance may be multiple. For example, an ontology module A may inherit a data object type definition from an ontology module B and a property type definition from an ontology module C. For example, FIG. 4B illustrates direct and transitive inheritance. As shown, ontology module 415A may directly inherit data type definitions from other ontology module 417B and 417C. Further, since other ontology module 417B may directly inherit data type definitions from other ontology module 417D, ontology module 415A may transitively inherit data type definitions from ontology module 417D.

Multiple inheritance gives rise to the possibly of ambiguous data type definition conflicts. For example, an ontology module B may directly inherit from an ontology module A that defines a particular property type P. Thus, ontology module B may directly inherit the definition of property type P from ontology module A. However, if ontology module C directly inherits from both ontology module B and ontology module A and ontology module B defines (overrides) property type P differently from how property type P is defined by ontology module A, then there is ambiguity as to which definition for property type P should be inherited by ontology module C. In particular, it is not clear without further information whether ontology module C should inherit property type P as defined by ontology module B or as defined by ontology module A.

According to some embodiments of the present invention, ambiguous data type definition conflicts resulting from multiple inheritance may be resolved by an analyst 320 as described below. Before that, however, the high-level process for creating a dynamic modular ontology will be described according to some embodiments of the present invention.

5.0 Process for Creating a Dynamic Modular Ontology

The following description presents method steps that may be implemented using computer-executable instructions, for directing operation of a device under processor control. The computer-executable instructions may be stored on a computer-readable storage medium, such as CD, DVD, hard disk, flash memory, or the like. The computer-executable instructions may also be stored as a set of downloadable computer-executable instructions, for example, for downloading and installation from an Internet location (e.g., a Web server).

Figure 5:
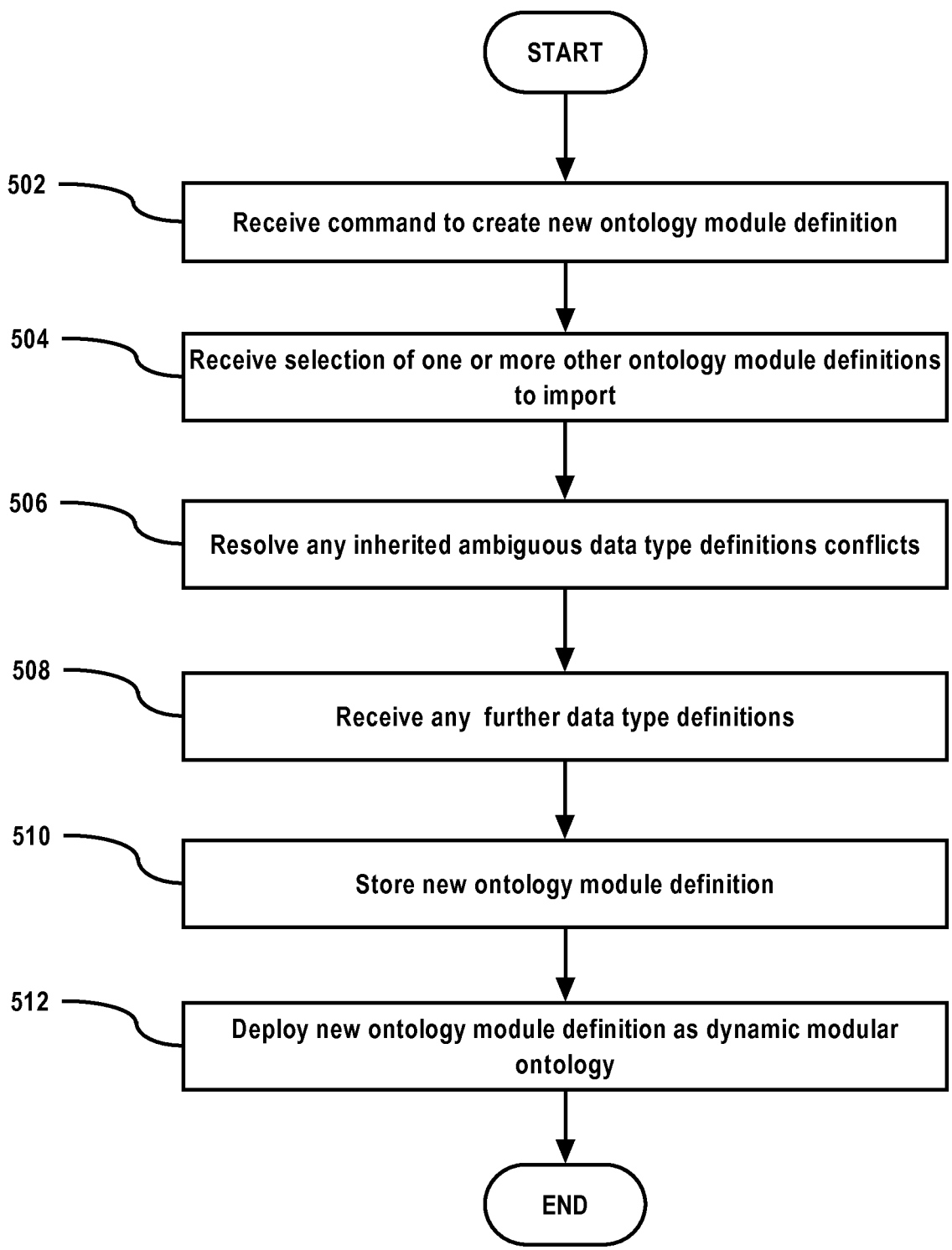
FIG. 5 is a flowchart of a process for creating a dynamic modular ontology according to some embodiments of the present invention.

FIG. 5 is a flowchart of a process 500 for creating a dynamic modular ontology according to some embodiments of the present invention. According to some embodiments of the present invention, the process 500 is performed by the ontology application 377. In these embodiments, some of the steps of the process 500 may be performed by a client 330 and some of the steps of the process 500 may be performed by the dispatch server 350. In other embodiments, however, all of the steps of the process 500 may be performed by a client 330, or all of the steps of the process 500 may be performed by the dispatch server 350. Furthermore, the process 500 may involve performance of additional steps not shown in FIG. 5.

Some of the steps 500 may be performed in response to receiving input and/or data from an analyst 320. Such input and/or data may be provided by the analyst 320 through a graphical user interface presented at a client 330 using one or more user input devices. Such user input devices may include, for example, a physical or soft keyboard, a pointing device (e.g., a mouse), a touch sensitive surface (e.g., a touch screen display), and the like.

At step 502, the ontology application 377 receives a command from an analyst 320 to create a new ontology module 415. In conjunction with receiving the command, the ontology application 377 may receive from the analyst 320 a unique fully-qualified hierarchical identifier (or a portion thereof) of the new ontology module 415. The fully-qualified hierarchical identifier is used to create an exclusive namespace for new data types defined in the new ontology module 415. Such new data types may extend and/or re-use inherited data types defined in other ontology modules 417 that the new ontology module 415 inherits from.

According to some embodiments of the present invention, the unique fully-qualified hierarchical identifier of the new ontology module 415 is a unique universal resource indicator (URI). For example, the URI for the new ontology module 415 may be "com.example.ontmod.ABCD" where "ABCD" is a locally unique identifier that uniquely identifies the new ontology module 415 within the "com.example.ontmod" unique fully-qualified hierarchical namespace. According to some embodiments of the present invention, the analyst 320 provides just the locally unique identifier of the new ontology module 415 within a given unique fully-qualified hierarchical namespace from which a unique fully-qualified hierarchical identifier of the new ontology module 415 can be formed. For example, the analyst 320 may provide just the locally unique identifier "ABCD" with which the ontology application 377 may form the unique fully-qualified hierarchical identifier "com.example.ontmod.ABCD" for the new ontology module 415.

At step 504, the ontology application 377 receives from the analyst 320 one or more selections of one or more other ontology modules 417 to import into the new ontology module 415. By importing another ontology module 417, the data type definitions in the imported ontology module 417 can be re-used and/or extended in the new ontology module 415. For example, a data object type definition in an imported ontology module 417 may be used to type investigative data 365 without having to re-define the data object type definition in the new ontology module 415. As another example, a property type definition in an imported ontology module 417 may be selectively re-defined (extended) in the new ontology module 415 and the specialized definition of the property type in the new ontology module 415 used to type investigative data 365.

At step 506, the ontology application 377 resolves any ambiguous data type definition conflicts. Such conflicts may arise if more than one other ontology module 417 is imported into the new ontology module 415 at step 504. In particular, if two imported ontology modules 417 define the same data type differently, then an ambiguous data type definition conflict arises. The conflict may need to be resolved before a definition for the data type can be re-used and/or extended in the new ontology module 415.

According to some embodiments of the present invention, an ambiguous data type definition conflict is resolved automatically by the ontology application 377 according to one or more conflict resolution rules. According to other embodiments of the present invention, an ambiguous data type definition conflict is resolved with the aid of analyst 320 input. According to some embodiments, resolving an ambiguous data type definition conflict for a data type involves creating a new definition for the data type in new ontology module 415 that reflects results of automatically resolving the conflict or the results of resolving the conflict with the aid of analyst 320 input.

At step 508, the ontology application 377 receives one or more further data type definitions from the analyst 320. Such a data type definition may define an entirely new data type or extend a data type definition from the imported ontology modules 417.

At step 510, the ontology application 377 stores the new ontology module 415 in persistent data container such as in a file on a non-volatile data storage medium. By doing so, the new ontology module 415 can be imported by other ontology modules, as in step 540 above, or otherwise used to create a dynamic modular ontology 410. Furthermore, the data container may be shared with other analysts 320 for use in creating their own dynamic modular ontologies 410. For example, the data container may be sent to another analyst 320 as an e-mail attachment or made available for download from a web server.

In some embodiments, the data container containing the definition of the new ontology module 415 is managed by a source code management system such as, for example, GIT/STASH. This allows the definition of the ontology module 415 to be managed like a source code file. For example, an analyst can retrieve the definition of the ontology module 415 from the source code management system for use in constructing another ontology module that imports the ontology module 415.

At step 512, the ontology application 377 deploys the new ontology module 415 as a dynamic modular ontology 410. Such deployment may involve parsing or otherwise analyzing the new ontology module 415, generating metadata representing the dynamic modular ontology 410 based on results of the analyzing, and storing the generated metadata in the data repository 360 for use by the dispatch server 350 in data typing the investigative data 365 according to the dynamic modular ontology 410.

While the dynamic modular ontology creation process 500 described above includes a number of steps that appear to occur in a specific order, it should be apparent that the process 500 can include more or fewer steps, which can be executed serially or in parallel (e.g., using parallel or distributed processors or multi-process or multi-threaded environment), and order of two or more steps may be changed and/or two or more steps may be combined into a single step.

6.0 Ontology Module Definition

Figure 6:
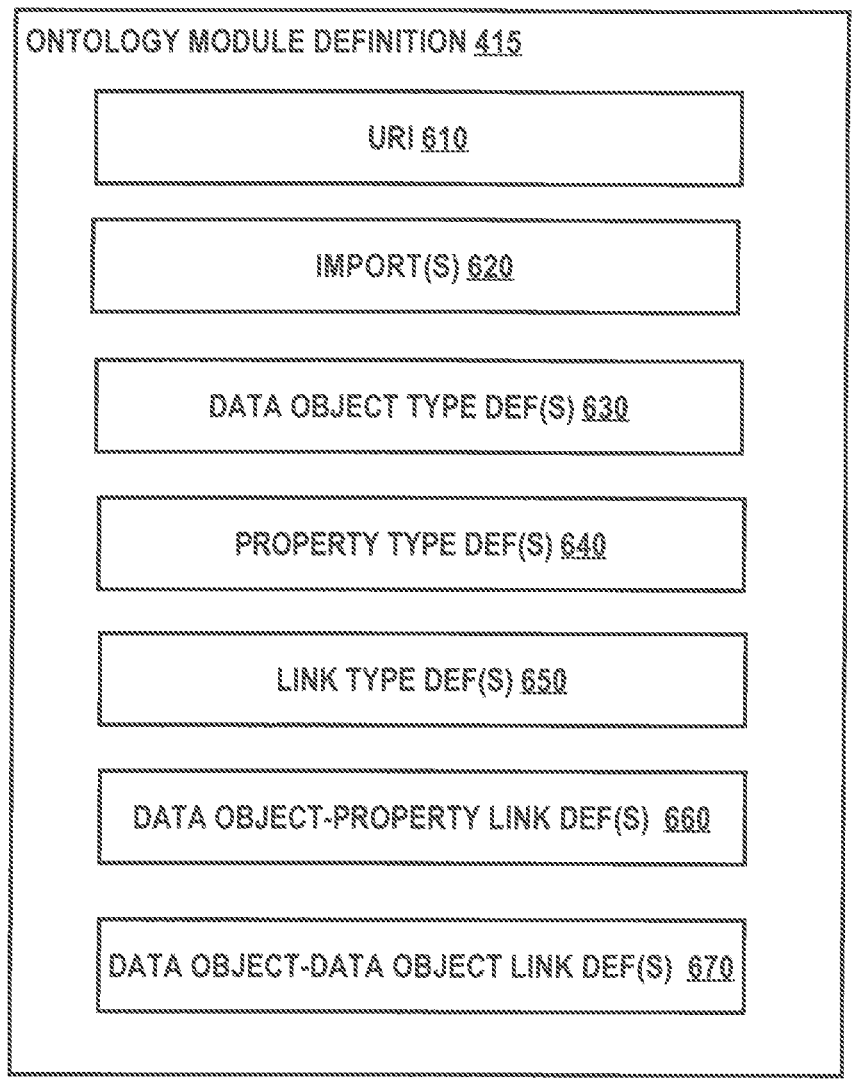
FIG. 6 is a block diagram illustrating an ontology module according to some embodiments of the present invention.

Turning now to FIG. 6, it is a block diagram of an ontology module 415 that may be created as part of the dynamic modular ontology creation process 500 described above.

In some embodiments, an ontology module 415 may include the following attributes, or a subset or a superset thereof:
- a unique universal resource indicator (URI) 610,
- one or more imports 620,
- one or more data object type definitions 630,
- one or more property type definitions 640,
- one or more link type definitions 650,
- one or more data object type-property type link definitions 660, and/or
- one or more data object type-data object type link definitions 670.

URI 610 is a unique fully-qualified hierarchical identifier of the ontology module definition 415.

An import 620 identifies another ontology module 417 imported by the current ontology module 415. In some embodiments of the present invention, an import 620 includes the URI 610 of the other ontology module 417 that is imported. In some embodiments of the present invention, an import 620 identifies a data container (e.g., by a file path or a URL) that contains the other ontology module 417 that is imported. The ontology module 415 may contain more than one import 620 if multiple other ontology module 417 are imported.

A data object type definition 630 defines a new data object type or extends the definition of an existing data object type (e.g., a data object type defined in an imported ontology 417). The ontology module 415 may contain multiple data object type definitions 630. An example data object type definition 630 is described below with respect to FIG. 7.

A property type definition 640 defines a new property type or extends the definition of an existing property type (e.g., a property type defined in an imported ontology module 417). The ontology module 415 may contain multiple property type definitions 640. An example property type definition 640 is described below with respect to FIG. 8.

A link type definition 650 defines a new link type or extends the definition of an existing link type (e.g., a link type defined in an imported ontology module 417). The ontology module 415 may contain multiple link type definitions 650. An example property type definition 650 is described below with respect to FIG. 9.

A data object type-property type link definition 660 defines or extends, for a given data object type, what property types are fundamental to the data object type, what property types are allowable for the data object type, and what property types are not allowable for the data object type. The ontology module 415 may contain multiple data object type-property type link definitions 660. An example property type definition 660 is described below with respect to FIG. 10.

A data object type-data object type link definition 670 defines or extends, for a given data object type and a given link type, what other data object types are allowed to be connected with the given data object type through the given link type and what other data object types are not allowed to be connected with the given data object type through the given link type. The ontology module 415 may contain multiple data object type-data object type link definitions 670. An example property type definition 670 is described below with respect to FIG. 11.

7.0 Data Object Type Definition

Figure 7:
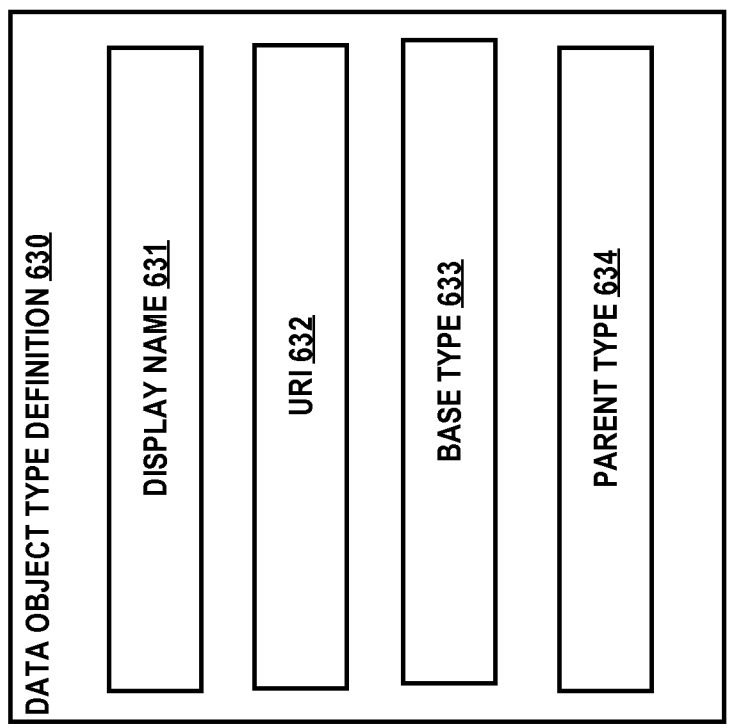
FIG. 7 is a block diagram illustrating a data object type definition according to some embodiments of the present invention.

Turning now to FIG. 7, it is a block diagram of a data object type definition 630 that may be part of an ontology module 415.

In some embodiments, a data object type definition 630 may include the following attributes, or a subset or a superset thereof:
- a display name 631,
- a universal resource indicator 632,
- a base data object type 633, and/or
- a parent data object type 634.

The display name 631 may be used as a default label for data objects of the data object type 630. For example, an Airline Flight data object type may have the display name 631 "Commercial Flight."

The URI 632 may be a unique fully-qualified hierarchical identifier for the data object type 630. For example, a Commercial Flight data object type may have the URI 632 "com.example.object.commericalflight."

The base data object type 633 may define the general kind and structure of the data that data objects of the data object type 630 can contain. According to some embodiments, the base data object type 633 is one of an "Entity" data object type 630, an "Event" data object type 630, a "Document" data object type, or a "Multimedia" data object type 630.

The parent data object type 634 may define the direct parent data object type 630 of the data object type 630 in the dynamic modular ontology 410. For example, a CommericalFlight data object type 630 may have the Flight data object type 630 as the parent data object type 634. According to some embodiments, if the data object type 630 does not define the parent data object type 634, then the base data object type 633 may be used as the parent data object type 634 for the data object type 630.

A data object type definition 630 may define a new data object type or extend an existing data object type. If extending an existing data object type, one or more of the above attributes may be further defined (specialized) in the data object type definition 630 and other of the remaining above attributes that are not further defined (specialized) in the data object type definition 630 may be inherited from a data object type definition 630 that is being extended. Any inherited attributes are effectively attributes of the data object type definition 630.

8.0 Property Type Definition

Figure 8:
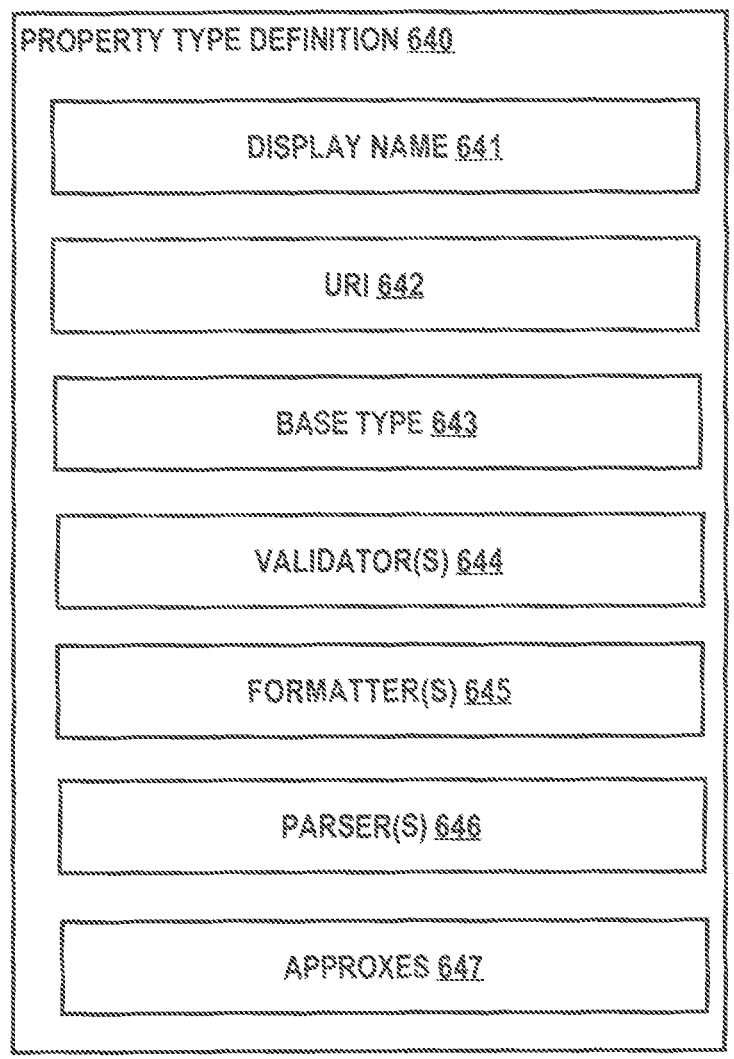
FIG. 8 is a block diagram illustrating a property type definition according to some embodiments of the present invention.

Turning now to FIG. 8, it is a block diagram of a property type definition 640 that may be part of an ontology module 415.

In some embodiments, a property type definition 640 may include the following attributes, or a subset or a superset thereof:
- a display name 641,
- a unique universal resource indicator 642,
- a base property type 643,
- one or more validators 644,
- one or more formatters 645,
- one or more parsers 646, and/or
- one or more approxes 647.

The display name 641 may be used with a property of the property type 640 is displayed in a graphical user interface.

For example, a Person data object type 630 may have a Name property type 640 with the display name 641 "Name".

The URI 642 is a unique fully-qualified hierarchical identifier of the property type 640. For example, a Name property type 640 may have the URI 642 "com.example.property.Name".

The base property type 643 specifies the general type and structure of the data that a property of the property type 640 can contain. According to some embodiments, the base property type 643 is one of: String, Number, Date, Enumeration, or Composite. If String, then the value of a property of the property type 640 can contain a string of text. If Number, then the value of a property of the property type 640 can contain a number. If Date, then the value of a property of the property type 640 can contain a date. If Enumeration, then the value of a property of the property type 640 can contain one value in a list of predefined enumeration values. If Composite, then the value of a property of the property type 640 may be a combination one or more String values, one or more Number values, and/or one or more Date values.

A validator 644 may be used to ensure to that a value entered by an analyst 320 for a property of the property type 640 is valid before it is accepted (stored) as value for the property as part of investigative date 365. A validator 644 may define a condition that an entered value must meet in order for the value to be considered valid and accepted as value for the property. According to some embodiments of the present invention, the validator(s) 644 of the property type 640 may include the following conditions, or a subset or a superset thereof:

Enumeration—If the base property type 643 is Enumeration, this condition ensures that the entered value is one of the possible predefined enumeration values.

Integer—If the base property type 643 is Number, this condition ensure that the entered value is an integer in a predetermined range (e.g., $-2^{32}$ to $2^{32}-1$).

Length—If the base property type 643 is String, this condition ensures that the entered value at least a minimum number of specified characters but not more than a maximum number of specified characters.

IP Address—If the base property type 643 is String, this condition ensures the entered value is property formatted IP address.

Number—If the base property type 643 is Number, this condition ensures the entered value is a real number.

Numerical Range—If the base property type 643 is Number, this condition ensures the entered value is numeric and falls within a specified range.

Regular Expression—If the base property type 643 is String, this condition ensure the entered value matches a specified regular expression.

A formatter 645 may be used to format a value of a property of the property type 640 for display in a graphic user interface. A formatter 645 may define a display rule that governs how the value of a property of the property type 640 is displayed. For example, a formatter 645 for a Name property type 640 may specify that values of properties of that property type 640 are to be displayed: {FIRST_NAME} {LAST_NAME}. Alternatively, the formatter 645 for the Name property type 640 may specify that values of properties of that property type 640 are to be displayed: {LAST_NAME}, {FIRST_NAME}.

A parser 646 may be used to extract a value for a property of the property type 640 from text data entered by an analyst 320 or other provided text data. A parser 646 may include a regular expression for pattern matching the property value in given text data.

The approxes 647 may be used to specify criteria for a fuzzy match when comparing data to a value of a property of the property type 640. For example, the approxes 647 of a property type definition 640 may include the following types, or a subset or a superset thereof:

Address Approx Type—For fuzzy matching street or postal addresses.

Duration Approx Type—For fuzzy matching measurements of time in different time units.

Metaphone Approx Type—For fuzzy matching on similarly sounding names or words.

Regular Expression Approx Type—For fuzzy matching based on a regular expression.

A property type definition 640 may define a new property type or extend an existing property type. If extending an existing property type, one or more of the above attributes may be further defined (specialized) in the property type definition 640 and other of the remaining above attributes that are not further defined (specialized) in the property type definition 640 may be inherited from a property type definition 640 that is being extended. Any inherited attributes are effectively attributes of the property type definition 640.

9.0 Link Type Definition

Figure 9:
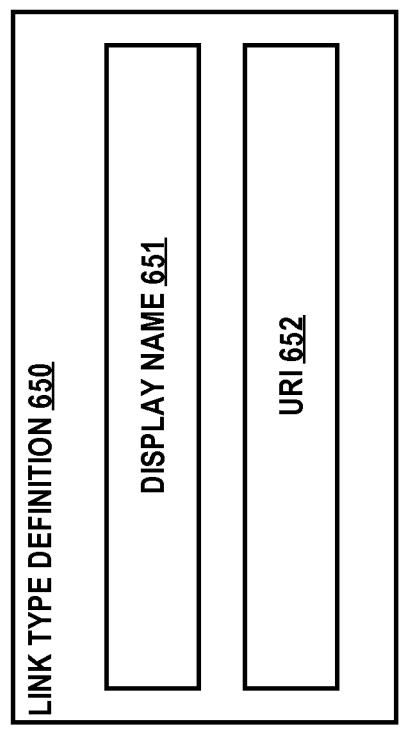
FIG. 9 is a block diagram illustrating a link type definition according to some embodiments of the present invention.

Turning now to FIG. 9, it is a block diagram of a link type definition 650 that may be part of an ontology module 415.

In some embodiments, a link type definition 650 may include the following attributes, or a subset or a superset thereof:

a display name 651, and/or a unique universal resource indicator 652.

The display name 651 may include a label displayed when a link of the link type 650 is displayed in a graphical user interface. For example, a link of an Employer/Employee link type 650 may have the display name 651 "Employer Of/Employee Of."

The URI 652 may be a unique fully-qualified hierarchical identifier of the link type 650. For example, the URI 652 of an Employer/Employee link type 650 may be "com.example.link.employerof."

A link type definition 650 may define a new link type or extend an existing link type. If extending an existing link type, one or more of the above attributes may be further defined (specialized) in the link type definition 650 and other of the remaining above attributes that are not further defined (specialized) in the link type definition 650 may be inherited from link type definition 650 that is being extended. Any inherited attributes are effectively attributes of the link type definition 650.

10.0 Data Object Type-Property Type Definition

Figure 10:
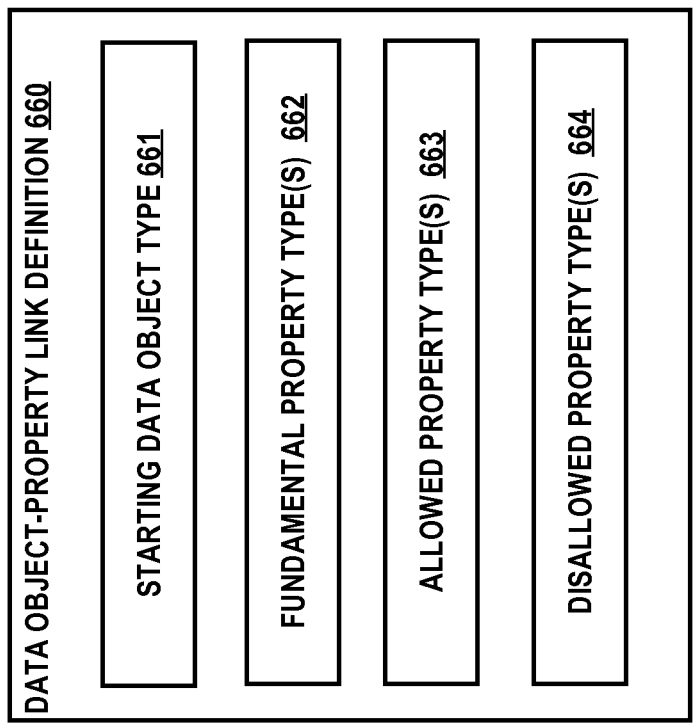
FIG. 10 is a block diagram illustrating a data object type-property type link definition according to some embodiments of the present invention.

Turning now to FIG. 10, it is a block diagram of a data object type-property type link definition 660 that may be part of an ontology module 415.

In some embodiments, a data object type-property type link definition 660 may include the following attributes, or a subset or a superset thereof:

a starting data object type 661, one or more fundamental property types 662, one or more allowed property types 663, and/or one or more disallowed property types 664.

The starting data object type 661 specifies the data object type 630 to which the data object type-property type link definition 660 applies.

A fundamental property type 662 may specify a property type 640 for which most, if not all, data objects of the starting data object type 661 will have a value. For example, the fundamental property types 662 for a Phone Call data object type 630 may include a Date property type 640, a Duration property type 640, and/or a Phone Number property type 640.

An allowed property type 663 may specify a property type 640 that is allowed for a property of a data object of the starting data object type 661.

A disallowed property type 664 may specify a property type 640 that is never allowed for a property of a data object of the starting data object type 661.

A data object type-property type link definition 660 may define a new data object type-property type link or extend an existing data object type-property type link. If extending an existing data object type-property type link, one or more of the above attributes may be further defined (specialized) in the data object type-property type link definition 660 and other of the remaining above attributes that are not further defined (specialized) in the data object type-property type link definition 660 may be inherited from a data object type-property type link definition 660 that is being extended. Any inherited attributes are effectively attributes of the data object type-property type link definition 660.

11.0 Data Object Type-Data Object Type Definition

Figure 11:
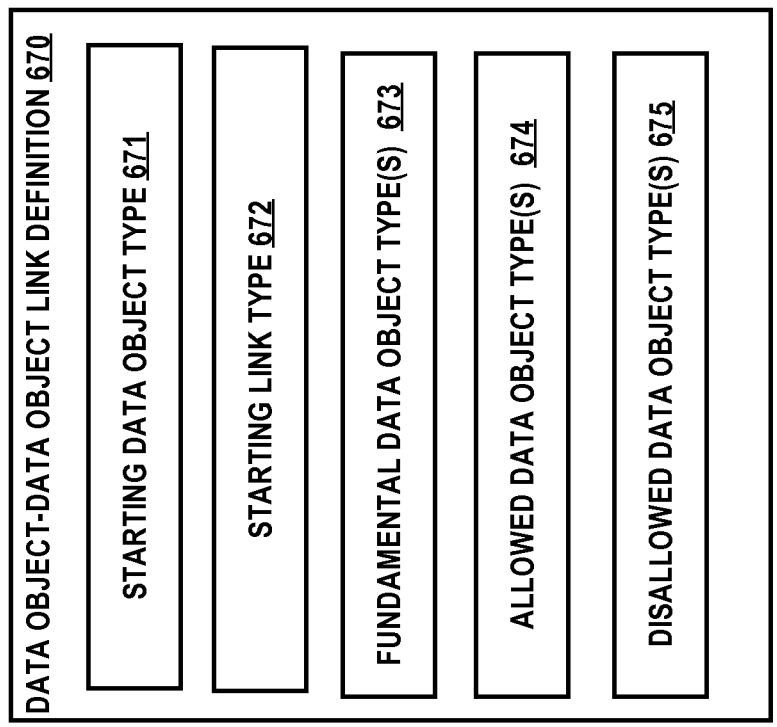
FIG. 11 is a block diagram illustrating a data object type-data object type link definition according to some embodiments of the present invention.

Turning now to FIG. 11, it is a block diagram of a data object type-data object type link definition 670 that may be part of an ontology module 415.

In some embodiments, a data object type-data object type link definition 670 may include the following attributes, or a subset or a superset thereof:
- a starting data object type 671,
- a starting link type 672,
- one or more fundamental data object types 673,
- one or more allowed data object types 674, and/or
- one or more disallowed data object types 675.

The starting data object type 671 specifies the data object type 630 to which the data object type-data object type link definition 670 applies.

The starting link type 672 specifies the link type 650 to which the data object type-data object type link definition 670 applies.

A fundamental data object type 673 may specify a data object type 630 that most often is expected to be connected to the starting data object type 672 by the starting link type 672.

An allowed data object type 664 may specify a data object type 630 that can be connected to the starting data object type 672 by the starting link type 672.

A disallowed data object type 665 may specify a data object type 630 that is not allowed to be connected the starting data object type 672 by the starting link type 672.

A data object type-data object type link definition 670 may define a new data object type-data object type link or extend an existing data object type-data object type link. If extending an existing data object type-data object type link, one or more of the above attributes may be further defined (specialized) in the data object type-data object type link definition 670 and other of the remaining above attributes that are not further defined (specialized) in the data object type-data object type link definition 670 may be inherited from a data object type-data object type link definition 670 that is being extended. Any inherited attributes are effectively attributes of the data object type-data object type link definition 670.

12.0 Concurrent Editing

According to some embodiments of the invention, an ontology module 415 may be concurrently edited. For example, a first analyst 320 and a second analyst 320 may use the ontology application 377 at different clients 330 to edit the same ontology module 415 at the same time. The ontology application 377 may employ a conflict resolution strategy to resolve conflicts between multiple analysts 320 editing the same ontology module 415.

According to some embodiments, the ontology application 377 employs a "first saved edit wins" conflict resolution approach. Under this approach, if an first analyst 320 saves a change to an ontology module 415 before a second analyst 320 saves a conflicting change to the ontology module 415, then the first analyst's 320 changes are applied to the ontology module 415 and the second analyst's 320 changes are rejected. A conflicting change can result if the first and second analysts 320 make concurrent changes to the same data object type definition 630, property type definition 640, link type definition 650, data object-property link definition 660, or data object-data object link definition 670, where "same" is defined as two definitions of the same type having the same universal resource indicator (URI).

According to some embodiments, to detect a conflicting change to the same ontology module 415 a checksum approach is used. In particular, when an analyst 320 opens a version of an ontology module 415 for editing with the ontology application 337 a checksum uniquely identifying the version is obtained. In one embodiment, a commit identifier assigned to the version of the ontology module 415 by a source code control application is used as the checksum of the version. Next, when the analyst 320 attempts to save a change to the version made at the analyst's 320 client 330 to the current version of the ontology module 415, the checksum of the version being edited by the analyst 320 is compared to a checksum for the current version of the ontology module 415. If the two checksums match, then the current version of the ontology module 415 is updated with the analyst's 320 changes to produce a new current version of the ontology module 415. A new checksum for the new current version of the ontology module 415 is also computed. On the other hand, if the two checksums do not match, then the analyst's 320 changes are rejected and the current version of the ontology module 415 is not modified.

By employing a conflict resolution approach such as the first saved edit wins approach described above, the ontology application 377 allows multiple analysts 320 to concurrently edit the same ontology module definition 415 without one analyst's 320 changes to the definition 415 being silently overridden by another analyst's 320 changes to the definition. 415.

Although in some embodiments all of an analyst's 320 changes to a version of an ontology module 415 conflict with the current version of the ontology module 415, some of the analyst's 320 changes to a version of an ontology module 415 conflict with the current version of the ontology module 415 and some others of the analyst's 320 changes do not in other embodiments. For example, the analyst 320 may change data type definition A and data type definition B in a version of an ontology module 41 and only the change to data type definition A may conflict with the current version of the ontology module 415 while the change to data type definition B may not conflict with the current version of the ontology module 415. In this case, even if a conflict is detected between the two versions of the ontology module 415 (e.g., by using the checksum approach described above), the current version of the ontology module may be updated with the change to data type definition B while at the same time not being updated with the change to data type definition A.

13.0 Extensions and Alternatives

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

The invention claimed is:

1. A method performed by a computing system comprising one or more processors and storage media, the storage media storing one or more programs executed by the one or more processors to perform the method, the method comprising:
receiving a command from a first analyst to create a new domain-specific ontology module;
receiving, from the first analyst, a selection of a first domain-specific ontology module to import into the new domain-specific ontology module;
receiving, from the first analyst, configuration for the new domain-specific ontology module to directly inherit one or more data type definitions from the first domain-specific ontology module;
receiving, from a second analyst that is not the first analyst, a selection of a second domain-specific ontology module to import into the new domain-specific ontology module;
receiving, from the second analyst, configuration for the new domain-specific ontology module to directly inherit one or more data type definitions from the second domain-specific ontology module;
based on the receiving, from the second analyst, the configuration for the new domain-specific ontology module to directly inherit one or more data type definitions from the second domain-specific ontology module, detecting an ambiguous data type definition conflict between a first definition of a particular data type in the first domain-specific ontology module and a second definition of the particular data type in the second domain-specific ontology module;
wherein the second domain-specific ontology module is configured to directly inherit at least the first definition of the particular data type in the first domain-specific ontology module;
wherein the second domain-specific ontology module overrides the first definition of the particular data type directly inherited from the first domain-specific ontology module with the second definition of the particular data type;
wherein the detecting the ambiguous data type definition conflict is based, at least in part, on the new domain-specific ontology module being configured to directly inherit the first definition of the particular data type from the first domain-specific ontology module, directly inherit the second definition of the particular data type from the second domain-specific ontology module, and transitively inherit the first definition of the particular data type from the first domain-specific ontology module via the second domain-specific ontology module;
based on the detecting the ambiguous data type definition conflict, causing display of a graphical user interface to the second analyst that indicates the ambiguous data type definition conflict between the first definition of the particular data type in the first domain-specific ontology module and the second definition of the particular data type in the second domain-specific ontology module;
resolving the ambiguous data type definition conflict based on an input provided by the second analyst via the graphical user interface;
wherein the input selects at most one of the first definition of the particular data type or the second definition of the particular data type;
based on the resolving the ambiguous data type definition conflict, generating a third definition of the particular data type reflecting a resolution of the ambiguous data type definition conflict;
storing, in a data container, the new domain-specific ontology module comprising the third definition of the particular data type; and
wherein the third definition of the particular data type is one of the first definition or the second definition.

2. The method of claim 1, wherein the data container is a file.

3. The method of claim 1, wherein the particular data type is a data object, a property type, or a link type.

4. The method of claim 1, further comprising:
using the new domain-specific ontology module to type data objects, links, and properties stored in a database.

5. One or more non-transitory computer-readable media storing computer-executable instructions which, when executed by one or more processors, cause the one or more processors to perform:
receiving a command from a first analyst to create a new domain-specific ontology module;
receiving, from the first analyst, a selection of a first domain-specific ontology module to import into the new domain-specific ontology module;
receiving, from the first analyst, configuration for the new domain-specific ontology module to directly inherit one or more data type definitions from the first domain-specific ontology module;
receiving, from a second analyst that is not the first analyst, a selection of a second domain-specific ontology module to import into the new domain-specific ontology module;
receiving, from the second analyst, configuration for the new domain-specific ontology module to directly inherit one or more data type definitions from the second domain-specific ontology module;
based on the receiving, from the second analyst, the configuration for the new domain-specific ontology module to directly inherit one or more data type definitions from the second domain-specific ontology module, detecting an ambiguous data type definition conflict between a first definition of a particular data type in the first domain-specific ontology module and a second definition of the particular data type in the second domain-specific ontology module;

wherein the second domain-specific ontology module is configured to directly inherit at least the first definition of the particular data type in the first domain-specific ontology module;

wherein the second domain-specific ontology module overrides the first definition of the particular data type directly inherited from the first domain-specific ontology module with the second definition of the particular data type;

wherein the detecting the ambiguous data type definition conflict is based, at least in part, on the new domain-specific ontology module being configured to directly inherit the first definition of the particular data type from the first domain-specific ontology module, directly inherit the second definition of the particular data type from the second domain-specific ontology module, and transitively inherit the first definition of the particular data type from the first domain-specific ontology module via the second domain-specific ontology module;

based on the detecting the ambiguous data type definition conflict, causing display of a graphical user interface to the second analyst that indicates the ambiguous data type definition conflict between the first definition of the particular data type in the first domain-specific ontology module and the second definition of the particular data type in the second domain-specific ontology module;

resolving the ambiguous data type definition conflict based on an input provided by the second analyst via the graphical user interface;

wherein the input selects at most one of the first definition of the particular data type or the second definition of the particular data type;

based on the resolving the ambiguous data type definition conflict, generating a third definition of the particular data type reflecting a resolution of the ambiguous data type definition conflict;

storing, in a data container, the new domain-specific ontology module comprising the third definition of the particular data type; and wherein the third definition of the particular data type is one of the first definition or the second definition.

6. The one or more non-transitory computer-readable media of claim 5, wherein the data container is a file.

7. The one or more non-transitory computer-readable media of claim 5, wherein the particular data type is a data object, a property type, or a link type.

8. The one or more non-transitory computer-readable media of claim 5, wherein the computer-executable instructions, when executed by the one or more processors, further cause the one or more processors to perform:

using the new domain-specific ontology module to type data objects, links, and properties stored in a database.

9. A system comprising:
one or more processors;
one or more non-transitory computer-readable media storing one or more computer programs configured, when executed by the one or more processors, to perform:
receiving a command from a first analyst to create a new domain-specific ontology module;
receiving, from the first analyst, a selection of a first domain-specific ontology module to import into the new domain-specific ontology module;
receiving, from the first analyst, configuration for the new domain-specific ontology module to directly inherit one or more data type definitions from the first domain-specific ontology module;
receiving, from a second analyst that is not the first analyst, a selection of a second domain-specific ontology module to import into the new domain-specific ontology module;
receiving, from the second analyst, configuration for the new domain-specific ontology module to directly inherit one or more data type definitions from the second domain-specific ontology module;
based on the receiving, from the second analyst, the configuration for the new domain-specific ontology module to directly inherit one or more data type definitions from the second domain-specific ontology module, detecting an ambiguous data type definition conflict between a first definition of a particular data type in the first domain-specific ontology module and a second definition of the particular data type in the second domain-specific ontology module;
wherein the second domain-specific ontology module is configured to directly inherit at least the first definition of the particular data type in the first domain-specific ontology module;
wherein the second domain-specific ontology module overrides the first definition of the particular data type directly inherited from the first domain-specific ontology module with the second definition of the particular data type;
wherein the detecting the ambiguous data type definition conflict is based, at least in part, on the new domain-specific ontology module being configured to directly inherit the first definition of the particular data type from the first domain-specific ontology module, directly inherit the second definition of the particular data type from the second domain-specific ontology module, and transitively inherit the first definition of the particular data type from the first domain-specific ontology module via the second domain-specific ontology module;
based on the detecting the ambiguous data type definition conflict, causing display of a graphical user interface to the second analyst that indicates the ambiguous data type definition conflict between the first definition of the particular data type in the first domain-specific ontology module and the second definition of the particular data type in the second domain-specific ontology module;
resolving the ambiguous data type definition conflict based on an input provided by the second analyst via the graphical user interface;
wherein the input selects at most one of the first definition of the particular data type or the second definition of the particular data type;
based on the resolving the ambiguous data type definition conflict, generating a third definition of the particular data type reflecting a resolution of the ambiguous data type definition conflict;
storing, in a data container, the new domain-specific ontology module comprising the third definition of the particular data type; and
wherein the third definition of the particular data type is one of the first definition or the second definition.

10. The system of claim 9, wherein the data container is a file.

11. The system of claim 9, wherein the particular data type is a data object, a property type, or a link type.

* * * * *